United States Patent
Lechleiter et al.

(10) Patent No.: US 9,789,576 B2
(45) Date of Patent: Oct. 17, 2017

(54) TOOL HOLDER FOR RECEIVING AND LOCKING A TOOL TAPER ON A TOOL MAGAZINE, UNLOCKING DEVICE, AND TOOL MAGAZINE

(71) Applicant: DECKEL MAHO Pfronten GmbH, Pfronten (DE)

(72) Inventors: Karl Lechleiter, Oy-Mittelberg (DE); Matthias Mayr, Fuessen Weissensee (DE); Michael Trenkle, Pfronten (DE)

(73) Assignee: DECKEL MAHO PFRONTEN GmbH, Pfronten (DE)

( * ) Notice: Subject to any disclaimer, the term of this patent is extended or adjusted under 35 U.S.C. 154(b) by 921 days.

(21) Appl. No.: 13/951,352

(22) Filed: Jul. 25, 2013

(65) Prior Publication Data

US 2014/0031184 A1    Jan. 30, 2014

(30) Foreign Application Priority Data

Jul. 26, 2012    (DE) .................. 10 2012 213 207

(51) Int. Cl.
*B23Q 3/157* (2006.01)
*B23B 31/22* (2006.01)
(Continued)

(52) U.S. Cl.
CPC ...... *B23Q 3/15553* (2013.01); *B23B 31/1071* (2013.01); *B23B 31/263* (2013.01); *B23Q 3/157* (2013.01); *B23Q 3/15526* (2013.01); *B23Q 3/15746* (2013.01); *F15B 15/148* (2013.01); *B23Q 3/15724* (2016.11); *B23Q 2003/15527* (2016.11); *B23Q 2003/15531* (2016.11); *B23Q 2003/155428* (2016.11); *Y10T 279/1045* (2015.01); *Y10T 279/1091* (2015.01); *Y10T 279/17* (2015.01); *Y10T 279/34* (2015.01);
(Continued)

(58) Field of Classification Search
CPC ......... Y10T 483/1891; Y10T 483/1809; F15B 15/148; B23Q 3/15724; B23Q 2003/15527
USPC ..................................................... 483/59, 68
See application file for complete search history.

(56) References Cited

U.S. PATENT DOCUMENTS

| | | | |
|---|---|---|---|
| 3,817,391 A | 6/1974 | Lohneis | |
| 5,453,068 A * | 9/1995 | Rutschle | B23Q 3/15526 483/38 |

(Continued)

FOREIGN PATENT DOCUMENTS

| | | |
|---|---|---|
| DE | 2 325 629 A1 | 1/1974 |
| DE | 276976 A3 | 3/1990 |

(Continued)

OTHER PUBLICATIONS

Machine Translation of KR 10-0761192, which KR '192 was published Sep. 2007.*

(Continued)

*Primary Examiner* — Erica E Cadugan
(74) *Attorney, Agent, or Firm* — Christensen O'Connor Johnson Kindness PLLC

(57) ABSTRACT

The present disclosure relates to a tool holder to receive and lock a tool taper on a tool magazine, an unlocking device to unlock a tool taper that is received and is locked in a tool holder of this type, and a tool magazine for a machine tool comprising one or more tool holders of this type and an unlocking device of this type.

16 Claims, 14 Drawing Sheets

(51) Int. Cl.
  *B23Q 3/155* (2006.01)
  *B23B 31/26* (2006.01)
  *B23B 31/107* (2006.01)
  *F15B 15/14* (2006.01)

(52) U.S. Cl.
  CPC .... *Y10T 483/1755* (2015.01); *Y10T 483/1809* (2015.01); *Y10T 483/1836* (2015.01); *Y10T 483/1891* (2015.01)

(56) References Cited

U.S. PATENT DOCUMENTS

| | | | | |
|---|---|---|---|---|
| 6,003,416 A | * | 12/1999 | Ando | B23B 29/046 279/103 |
| 6,968,772 B2 | * | 11/2005 | Lin | B24B 37/345 92/128 |
| 2011/0245053 A1 | * | 10/2011 | Koyama | B23Q 3/15526 483/65 |

FOREIGN PATENT DOCUMENTS

| | | | |
|---|---|---|---|
| DE | 43 30 853 C1 | | 1/1995 |
| JP | 7-164272 A | | 6/1995 |
| JP | 3012496 U | | 6/1995 |
| JP | 8-19929 A | | 1/1996 |
| JP | 8-229766 A | | 9/1996 |
| JP | 11-048073 A | * | 2/1999 |
| JP | 2001-121374 A | * | 5/2001 |
| JP | 2005-28549 A | | 2/2005 |
| JP | 2007-245287 A | * | 9/2007 |
| JP | 2009-083066 A | * | 4/2009 |
| JP | 2010-240808 A | * | 10/2010 |
| JP | 2012-115953 A | * | 6/2012 |
| KR | 10-0761192 B1 | | 9/2007 |

OTHER PUBLICATIONS

Machine Translation of JP 2010-240808-A, which JP '808 was published Oct. 2010.*

German Examination Report mailed Jan. 7, 2013, issued in corresponding German Application No. 102012213207.4, filed Jul. 1, 2013, 14 pages.

European Search Report dated Feb. 21, 2014, in European Patent Application No. 13178213.8, filed Jul. 26, 2013, 8 pages.

Notification of Reasons for Refusal (JP) dated Jun. 7, 2017, issued in corresponding Japanese Application No. 2013-154437, 10 pages.

* cited by examiner

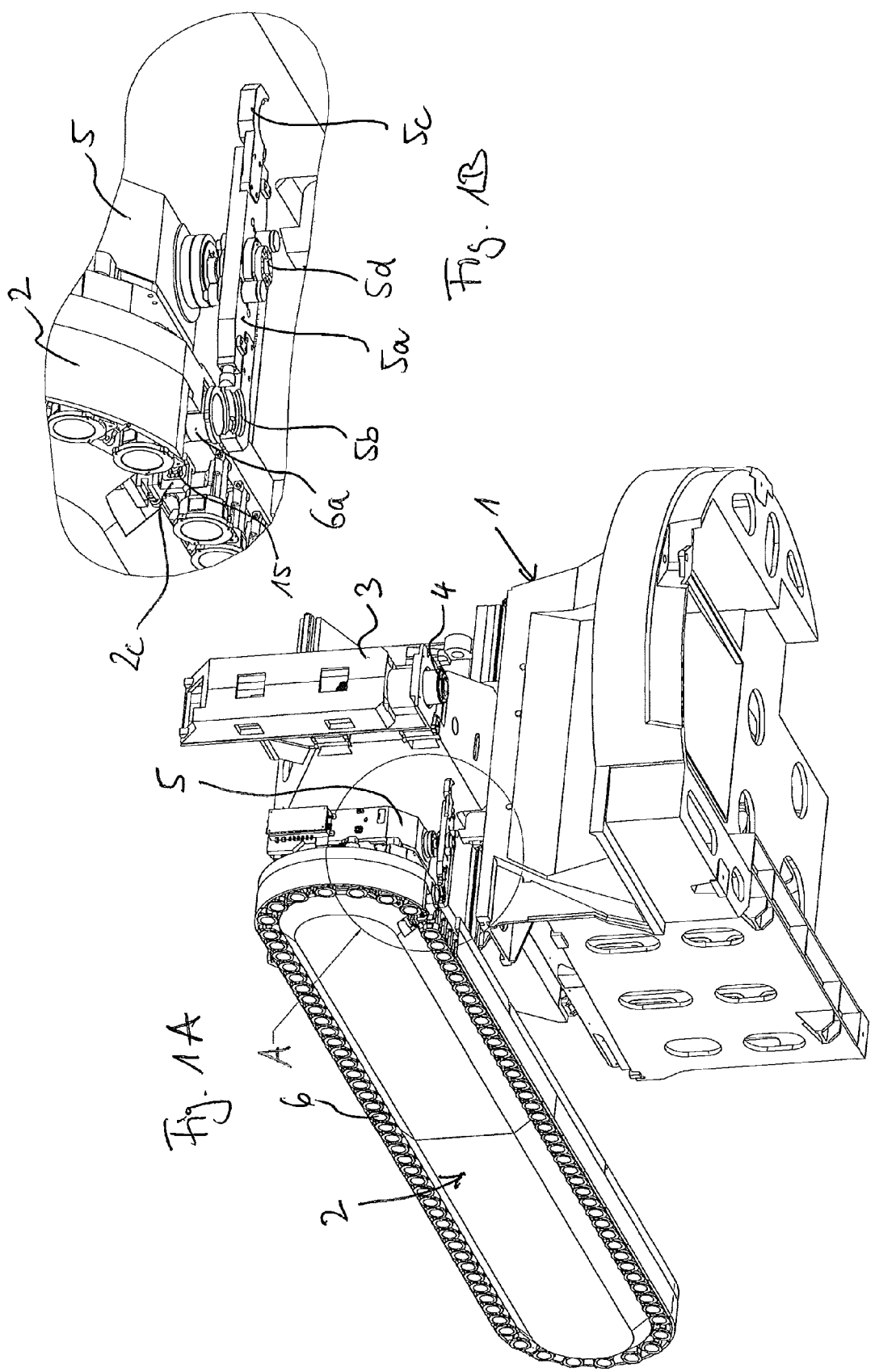

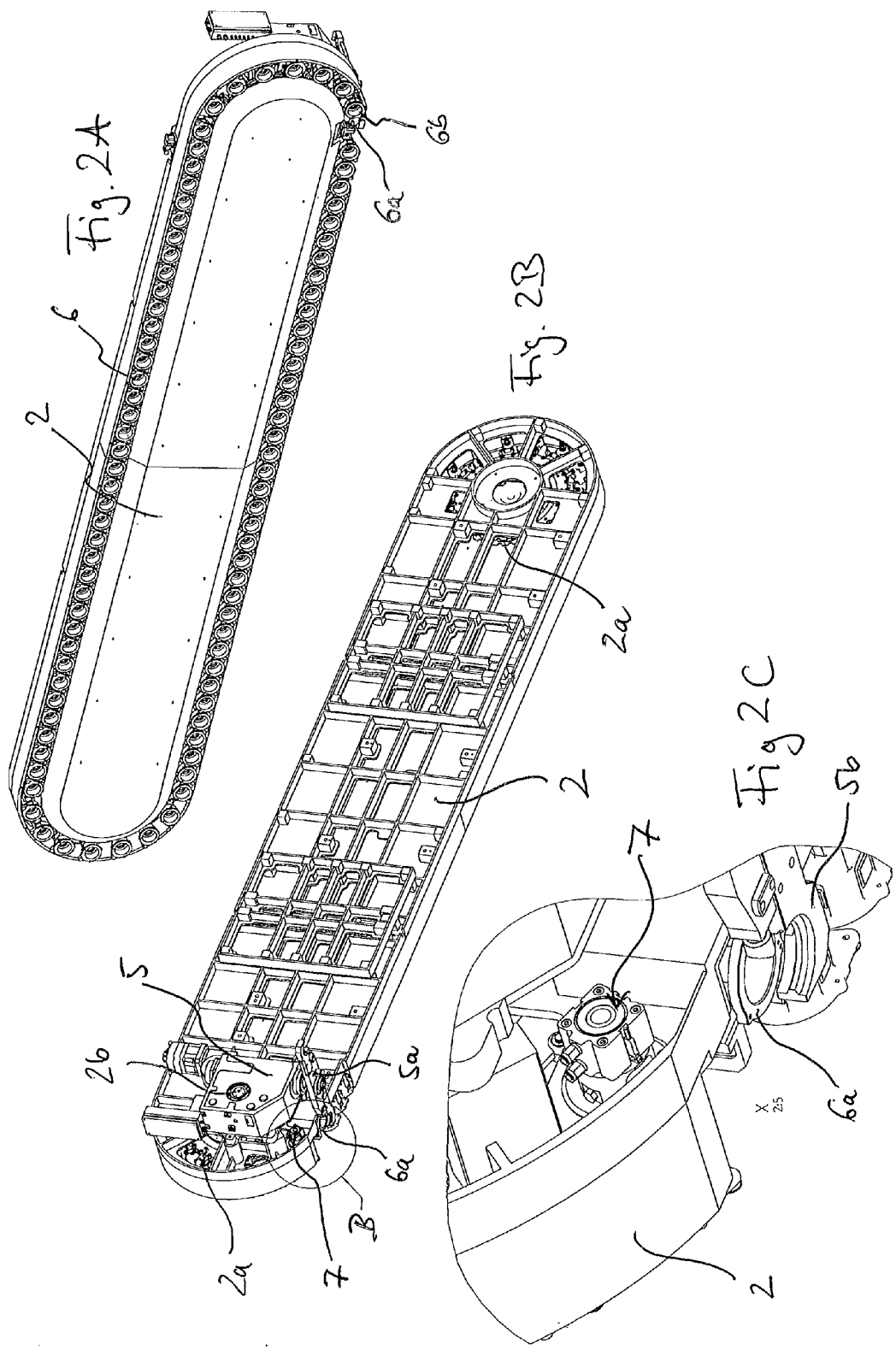

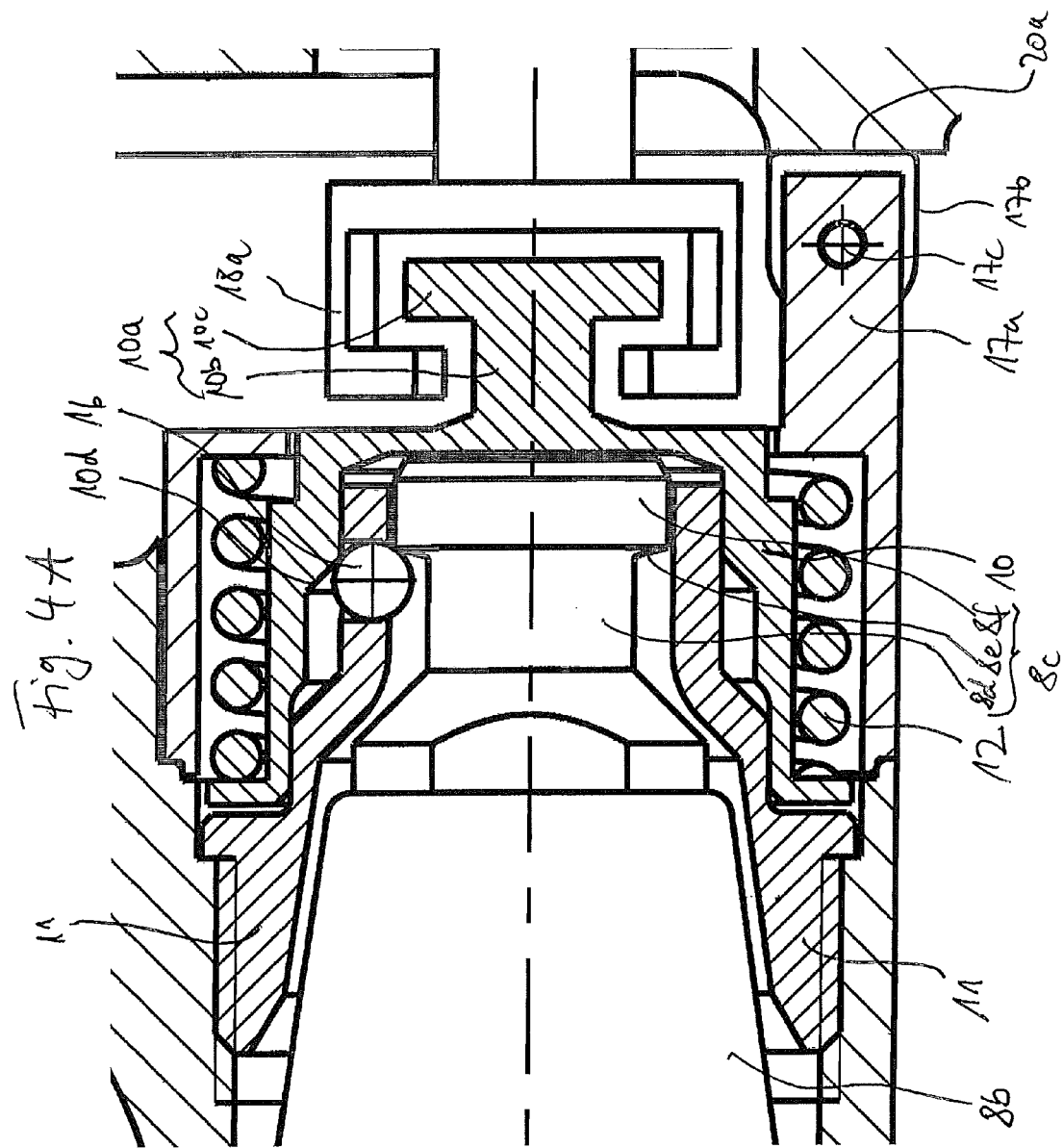

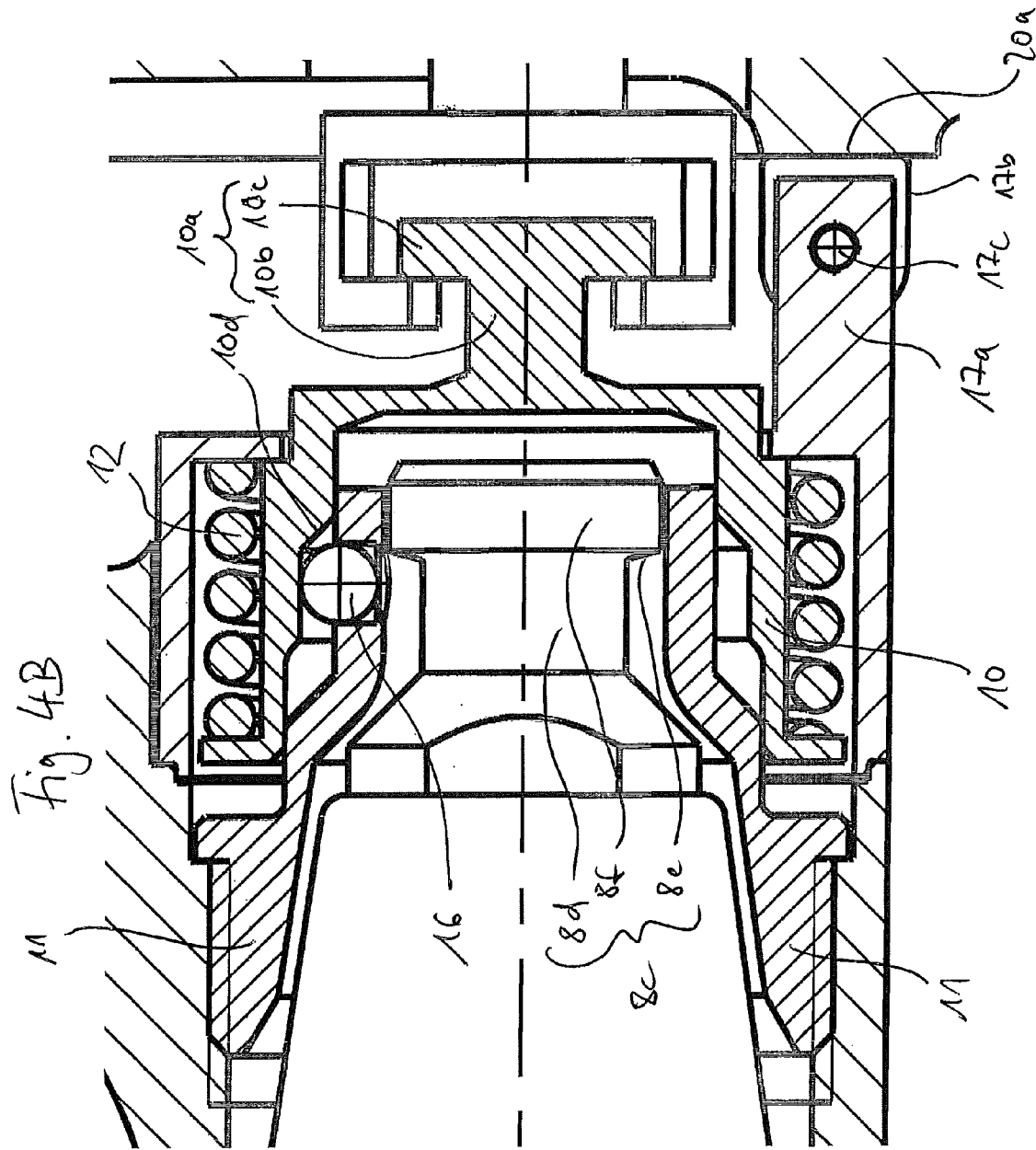

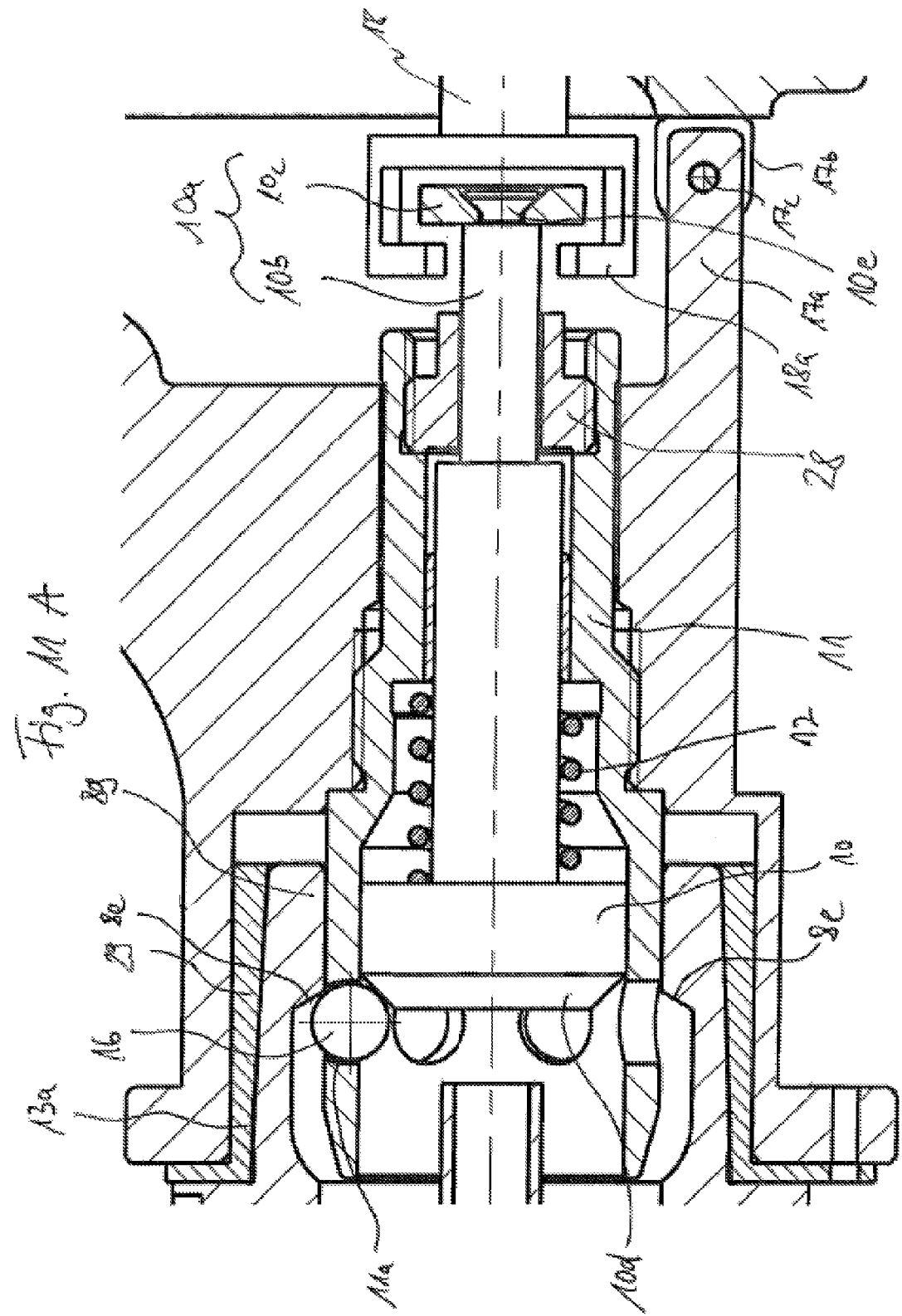

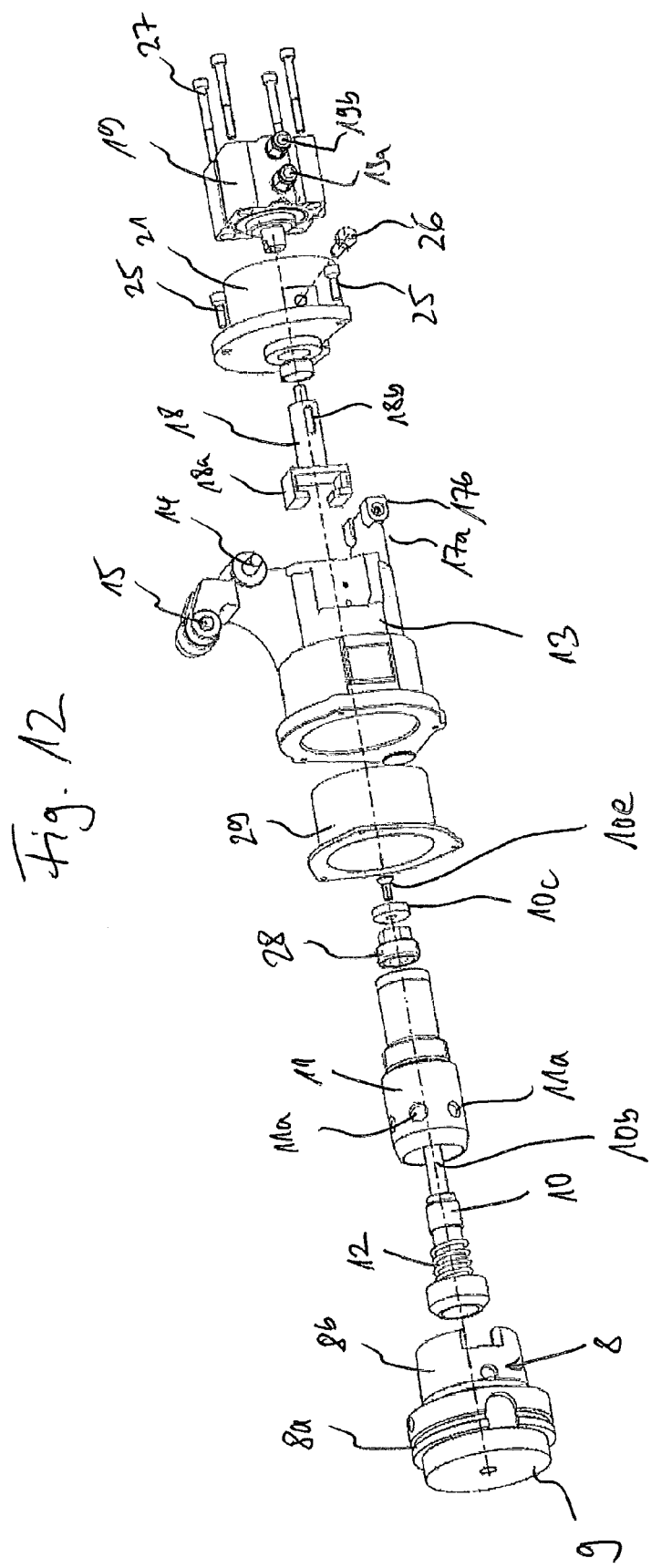

TOOL HOLDER FOR RECEIVING AND LOCKING A TOOL TAPER ON A TOOL MAGAZINE, UNLOCKING DEVICE, AND TOOL MAGAZINE

FIELD

The present disclosure relates to a tool holder to receive and lock a tool taper on a tool magazine, an unlocking device to unlock a tool taper, which is received and locked in a tool holder, and a tool magazine for a machine tool.

BACKGROUND

In the general prior art, tool magazines for receiving a plurality of tools on a machine tool are known, on which magazines, tool-holding tool tapers, such as hollow shaft tapers or steep tapers are received in respective tool holders attached to the tool magazine. It is necessary here to lock the tool tapers in the tool holders and to unlock them to unload or load the tool magazine.

Known locking mechanisms are configured here in such a way that a locking gripping portion locks the tool tapers on the gripper groove at the front. The problem occurs here that tool changer grippers and loading or unloading grippers also engage on the gripper groove of the tool tapers in order to remove the unlocked tool or the unlocked tool taper from the tool holder. Locking mechanisms of this type make the loading/unloading of the tool magazine or the execution of tool changes more difficult or delay them.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An object of the present disclosure is to improve a locking mechanism for locking or unlocking tool tapers in a tool holder of a tool magazine such that the unlocking or locking of the tool taper is easily allowed quickly and safely and, with simple means, allows an efficient loading and unloading of the tool magazine or an efficient tool change.

With regard to the object mentioned above of the present disclosure, proposed according to the disclosure are a tool holder for receiving and locking a tool taper on a tool magazine, an unlocking device for unlocking a tool taper received and locked in the tool holder, a system comprising one or more tool holders and an unlocking device, and a tool magazine for a machine tool.

A tool holder for receiving and locking a tool taper to a tool magazine according to the present disclosure comprises a receiving means for receiving the tool taper in the axial direction of the tool holder on a first side of the tool holder, a locking means for locking the tool taper received in the receiving means, and a first fastening means for fastening the tool holder on the tool magazine.

The locking means comprises a first tightening element that is movable in the axial direction and is set up to be moved from a first position in the axial direction into a second position, a tool taper received in the receiving means being locked when the first tightening element is in the first position, and the tool taper received in the receiving means being unlocked when the first tightening element is in the second position.

According to the present disclosure, the first tightening element has a first tightening portion that projects in the axial direction from the tool holder on a second side (i.e., on the rear side of the tool holder when the side of the tool holder having the tool taper receiver is called the front side), which second side opposes the first side of the tool holder, in particular to exert a force (for example, for an externally exerted force to engage) on the first tightening element, in order to move the first tightening element from the first position into the second or from the second position into the first.

The present disclosure is based on the idea of not providing a locking or unlocking mechanism on the front side of the tool holder, which engages on the gripper groove of the tool taper, but to provide a rear locking or unlocking mechanism, which can be easily actuated by an external unlocking device, in that a tightening portion of the movable tightening element projects on the rear side in the axial direction from the tool changer and therefore easily provides an engagement point for an unlocking device, on which a force pulling away from the tool holder and/or a force pressing toward the tool holder can be applied.

The first tightening portion is preferably configured in such a way that it can be brought into an engagement state with a second tightening portion of a separate unlocking device to unlock the tool taper received and locked in the tool holder to exert a force (or for an externally exerted force to engage) on the first tightening element by means of the second tightening element in the engagement state of the two tightening portions, in order to move the first tightening element from the first position into the second or from the second position into the first.

In the engagement state, the second tightening portion preferably has a positive non-detachable engagement with the first tightening portion in the axial direction. "Non-detachable positive engagement in the axial direction" in the present disclosure means that the second tightening portion and the first tightening portion mechanically block on both sides in the axial direction by respective mutual positive engagement (i.e., by the contact of opposing blocking portions), although preferably no simultaneous positive connection is present on both sides, so the first tightening portion and the second tightening portion are axially movable relative to one another at least within the limits of a limited axial play range and an axial relative movement going beyond the axial play range between the tightening portions in the two axial directions is positively blocked.

The first tightening portion is furthermore preferably configured in such a way that it can be brought into the engagement state with the second tightening portion by a relative movement with respect to the second tightening portion in a first direction perpendicular to the axial direction. The tightening portions can thus be brought efficiently and quickly into the engagement state in a particularly simple manner, for example, in that the tool holder is easily moved in the first direction perpendicular to the axial direction to the unlocking position of the tool magazine holding the unlocking device (and/or in that the unlocking device is moved in the first direction perpendicular to the axial direction or counter to the first direction to the tool holder).

The first tightening portion preferably has a tightening head on the end side that is configured to adopt the positive non-detachable engagement in the axial direction with the second tightening portion when the first and the second tightening portions are in the engagement state.

The first tightening portion preferably has a T-shaped profile or else an L-shaped profile in the axial direction.

The first fastening means is preferably set up to fasten the tool holder on the tool magazine so as to be pivotable about an axis arranged perpendicular to the axial direction of the tool holder.

The tool holder preferably furthermore comprises a first stopper portion that is arranged on the second side of the tool holder. The stopper portion preferably has a stopper element that projects from the tool holder on the second side of the tool holder in the axial direction. The stopper element preferably projects further from the tool holder in the axial direction than the first tightening portion.

The locking means preferably furthermore comprises a holding element that holds a radially movable locking element, the first tightening element preferably forcing the locking element in the radial direction into a clamping position, in which the locking element, to lock the tool taper, presses against a clamping face of the tool taper received in the receiving means when the first tightening element is in the first position.

The locking element is preferably movable in the radial direction between the clamping position and a release position when the first tightening element is in the second position, the locking element preferably not being in contact with the clamping face of the tool taper in the release position. The locking element is preferably configured as a ball element.

The receiving means is set up in an embodiment to receive a tool taper configured as a steep taper (ST), which has a tightening piston at the end. The first tightening element preferably then forces the locking element inwardly in the radial direction into the clamping position, in which the locking element, to lock the steep taper received in the receiving means, presses inwardly in the radial direction against the clamping face of the tightening piston of the steep taper when the first tightening element is in the first position.

The receiving means is set up in an alternative embodiment to receive a tool taper configured as a hollow shaft taper (HST), which has an inner clamping face in the interior of the hollow shaft of the hollow shaft taper. The first tightening element then preferably forces the locking element outwardly in the radial direction into the clamping position, in which the locking element, to lock the hollow shaft taper received in the receiving means, presses outwardly in the radial direction against the inner clamping face of the hollow shaft body of the hollow shaft taper when the first tightening element is in the first position.

Embodiments of the present disclosure thus allow a flexible application and a tool holder according to the present disclosure can be configured both to lock and unlock steep tapers and to lock and unlock hollow shaft tapers. In such embodiments, it is, in particular, advantageously possible to use the identical unlocking device (on different tool magazines) or even the same unlocking device (on the same tool magazine) both to unlock/lock ST-receiving tool holders and HST-receiving tool holders.

The locking means preferably furthermore comprises a spring element that is set up to exert a restoring force from the second position toward the first position on the first tightening element.

An unlocking device for unlocking a tool taper received and locked in the tool holder according to one or more of the above-mentioned aspects and a system comprising one or more tool holders according to one or more of the above-mentioned aspects and an unlocking device of this type are furthermore proposed according to the present disclosure.

An unlocking device according to the present disclosure for unlocking a tool taper received and locked in the tool holder comprises a second fastening means for fastening the unlocking device on the tool magazine at an unlocking position of the tool magazine and an unlocking means to unlock the tool taper received and locked in the tool holder when the tool holder is at the unlocking position.

The unlocking means comprises a second tightening element that is movable in the axial direction of the unlocking device, has a second tightening portion, and can be brought into an engagement state with the first tightening portion of the first tightening element, in which the second tightening portion is in positive non-detachable engagement in the axial direction with the first tightening portion of the first tightening element when the tool holder is at the unlocking position.

The unlocking means is set up to unlock a tool taper received in the receiving means when the first tightening portion and the second tightening portion are in the engagement state, in that the second tightening element is axially controlled and the first tightening element moves from the first axial position into the second axial position by means of the axial positive connection of the engagement state.

The second tightening portion is preferably configured in such a way that it can be brought by a relative movement with respect to the first tightening portion in a first direction perpendicular to the axial direction into the engagement state with the first tightening portion.

Finally, a tool magazine for a machine tool is also proposed according to the present disclosure.

The tool magazine comprises an unlocking device, according to one of the aforementioned aspects, which is fastened by the second fastening means at an unlocking position of the tool magazine; a tool holder fastening means; one or more tool holders, according to any one of the aforementioned aspects, which are in each case fastened by the first fastening means to the tool holder fastening means; and a displacing device for displacing the one or more tool holders fastened to the tool holder fastening means.

The displacing device is set up to move a first tool holder, which is fastened to the tool holder fastening means, in a first direction perpendicular to the axial direction of the first tool holder into the unlocking position and to thereby bring the first tightening element with the second tightening element into the engagement position.

DESCRIPTION OF THE DRAWINGS

Further aspects and advantages of the present disclosure can be seen from the following description of the accompanying figures, in which, by way of example:

FIG. 1A shows a perspective view of a machine tool according to an embodiment of the present disclosure;

FIG. 1B shows a detailed view of the detail A from FIG. 1A;

FIG. 2A shows a perspective front view of a tool magazine according to an embodiment of the present disclosure;

FIG. 2B shows a perspective rear view of the tool magazine from FIG. 2A;

FIG. 2C shows a detailed view of the detail B from FIG. 2B;

FIG. 4A shows a detailed view from FIG. 3A;

FIG. 4B shows a detailed view from FIG. 3B;

FIG. 11A shows a detailed view from FIG. 10A;

FIG. 12 shows an exploded view of a tool holder and an unlocking device according to the second embodiment of the present disclosure.

DETAILED DESCRIPTION

Figure 3A:
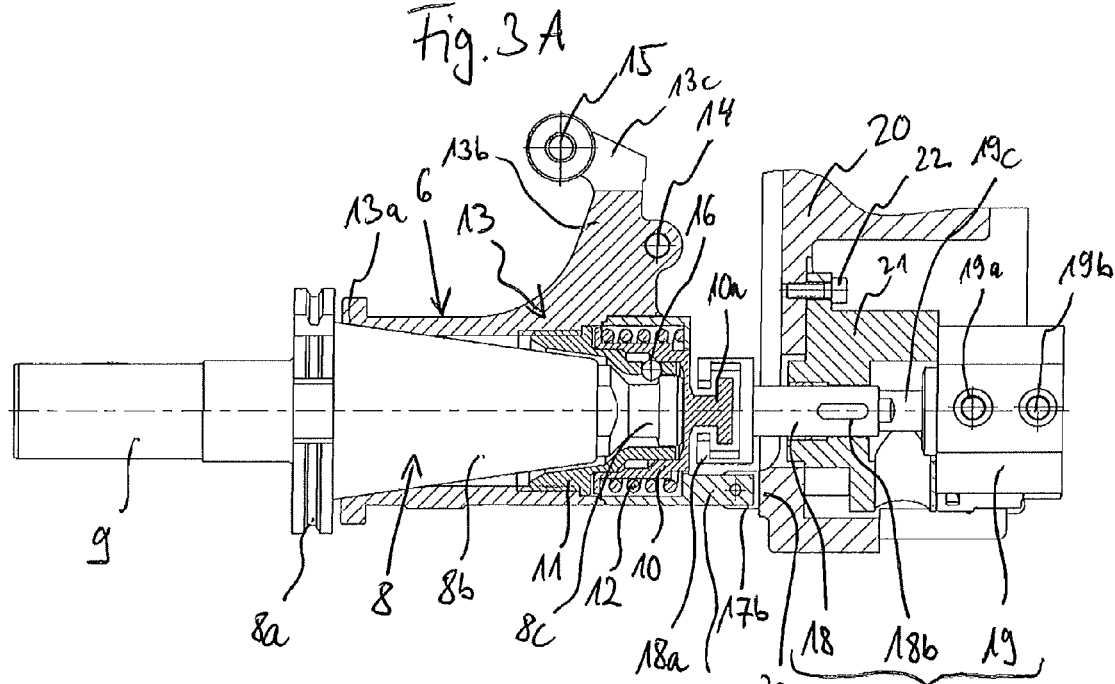
FIG. 3A shows a sectional view along the axial direction of a tool holder with a locked tool taper and an unlocking device according to a first embodiment of the present disclosure.

Embodiments of the present disclosure will be described in detail below with reference to the accompanying figures. The present disclosure is not, however, limited to the described embodiments. The present disclosure is defined by the scope of the claims. The same or similar features of the embodiments are designated by the same reference numerals in the figures.

FIG. 1A shows a machine tool 1 for machining a workpiece by means of a tool. The machine tool 1 comprises a spindle carrier 3, which can be moved vertically, by way of example, with a tool-carrying spindle 4, in which, for example, milling and drilling tools for milling or drilling machining of the workpiece can be received and driven.

By way of example, a tool magazine 2, in which a plurality of tools for machining a workpiece can be kept in readiness on the machine tool, is provided on one side of the machine tool.

By way of example, the tool magazine in FIG. 1A is configured as a chain magazine, in which the tool-receiving tool holders 6 are held on a movable chain. In further embodiments of the present disclosure, it is, however, likewise possible to provide other types of tool magazines, such as a rack magazine, a wheel magazine, a revolver magazine, a disc magazine, or others.

The tool magazine 2 comprises a plurality of tool holders 6 to receive the tools, the tools (such as milling tools, drilling tools, etc.) being received by a tool receiver in the tool holders 6, which are used as an interface between the tools and the spindle 4. Morse tapers, hollow shaft tapers (HSTs), and steep tapers (STs), or the like, for example, which are generally called tool tapers or else tool receivers or base receivers, are known in the prior art as interfaces or tool receivers of this type.

Furthermore, the machine tool 1, by way of example, comprises a tool changer 5 to change a tool received on the spindle 4. It is generally possible here to feed a tool by means of the tool changer 5 from a tool-changing position of the tool magazine 2 to the spindle 4 and to feed a tool from the spindle 4 to the tool-changing position of the tool magazine 2 and/or to exchange a tool received on the spindle 4 with a tool located at the tool-changing position of the tool magazine 2.

FIG. 1B shows a detailed view of the detail A from FIG. 1A. By way of example, the tool changer 5 comprises a rotatable double gripper arm 5a with a centrally arranged controllable round axle 5d and respective gripper portions 5b and 5c at the end to grip a tool or tool taper (in particular, to grip a tool taper on its gripper groove).

The double gripper arm 5a is advantageously set up in this exemplary embodiment to carry out a simultaneous tool change, in which one gripper portion 5c grips a tool received in the spindle 4 and the other gripper portion 5b grips a tool received in the tool holder 6a at the tool-changing position of the tool magazine 2 and changes the latter by a rotation through 180 degrees controlled by means of the round axle 5d.

In addition, the tool changer 5 is set up, by way of example, to move the double gripper arm 5a along the rotational axis of the round axle 5d (i.e., in the vertical direction in the embodiment according to FIG. 1A) in order to remove the tools gripped by means of the gripper portions 5b and 5c from the tool holder 6a or from the spindle 4 in the axial direction of the tool holder 6a or the spindle 4, or to insert them therein. It is therefore necessary in this exemplary configuration of the double gripper arm tool changer 5, at a tool change, to orient the axial directions of the tool holder 6a at the tool-changing position and of the spindle 4 parallel to one another.

FIG. 1B shows a tool holder 6a that is in the tool-changing position of the tool magazine 2. The tool magazine 2 is configured by way of example here in such a way that the tool holder 6a located at the tool-changing position, in contrast to the remaining tool holders 6 of the tool magazine 2, is pivoted downward through 90 degrees, so the axial direction of the tool holder 6a points vertically downward (in accordance with the receiving direction of the tool taper or in accordance with the axial direction of the tool taper when the latter is received in the tool holder) and is oriented in parallel with the axial direction of the spindle 4. The axial directions of the remaining tool holders 6 are, as can be seen in FIG. 1A, oriented, by way of example, horizontally and in each case parallel to one another.

FIG. 2A shows a perspective front view of the tool magazine 2 from FIG. 1A, for example, configured as a chain magazine. FIG. 2B shows a perspective rear view of the tool magazine 2 from FIG. 1A or FIG. 2A.

The tool magazine 2 comprises a plurality of tool holders 6 that are held next to one another along a peripheral, closed chain (not shown) of the tool magazine 2. Two chain wheels 2a that guide the chain holding the tool holders 6 are in each case arranged rotatably mounted on opposing sides of the tool magazine 2. The chain is driven for the peripheral movement of the tool holder 6 in that the chain wheel 2a located on the side of the tool changer 5 is driven by means of a controllable round axle 2b.

The tool holder 6a is located in FIG. 2A, analogously to FIG. 1A, at the tool-changing position of the tool magazine 2. An adjacent tool holder 6b is located at an unlocking position of the tool magazine 2. Because of the high displacement speeds of the tool holders 6 during the driving of the chain and for safety reasons, it is provided that the tools or the tool tapers received in the tool holders 6 are to be locked by means of a locking mechanism integrated in the tool holders 6.

It is necessary here to unlock the tools or tool tapers when the respective tool is to be removed from the tool magazine 2 at the unlocking position, optionally to load the tool holder 6 with a tool and/or to unload a tool received in the tool holder 6. The tool magazine 2 is set up to unlock the tool or the tool taper, which is received and locked in the tool holder 6b located at the unlocking position of the tool magazine 2.

The tool received and unlocked in the tool holder 6b or the tool taper received and unlocked in the tool holder 6b can then be removed from the tool holder 6b at the unlocking position to unload and load the tool magazine 2 (i.e., the unlocking position corresponds to the input position or tool input position of the tool magazine 2). Moreover, a tool taper can be placed in an empty tool holder 6b, for example, once the tool taper received until now has been removed.

Furthermore, the tool holder 6b can also be moved and pivoted to the adjacent tool-changing position in order to carry out a tool change, in which the tool received in the tool holder 6b or the tool taper received in the tool holder 6b is placed from the tool holder 6b in exchange into the spindle 4.

It is provided here, by way of example, according to this embodiment that no further unlocking device be provided at the tool-changing position. The locking mechanism is, by way of example, set up with a higher action of force by the automatic tool changer 5 on the gripper groove to automatically act against the spring force of the spring 12 (described later) and to release the locked tool taper in order to allow the tool changer 5, by means of a higher action of force on the gripper groove of the tool taper, to remove the locked tool taper without unlocking by means of an unlocking device. However, it is alternatively also conceivable to provide an additional unlocking device at the tool-changing position, in order to also unlock the tool taper actively at the tool-changing position for the tool change.

FIG. 2C shows a detailed view of the detail B from FIG. 2B. Arranged on the rear side of the tool magazine 2 at the unlocking position is an unlocking device 7 that is set up to unlock a tool taper received and locked in the tool holder 6b when the tool holder 6b is at the unlocking position or was moved into said position (and optionally in further embodiments, to also lock a tool taper received and unlocked in the tool holder 6b when the tool holder 6b is at the unlocking position).

FIG. 3A shows a sectional view along the axial direction of a tool holder 6 according to a first embodiment of the present disclosure with a locked tool taper 8, by way of example, configured as a steep taper in this embodiment, and an unlocking device 7 according to the first embodiment of the present disclosure. FIG. 3A shows the same sectional view along the axial direction of the unlocking device 7 and of the tool holder 6 according to the first embodiment of the present disclosure, but with an unlocked tool taper 8 and an unlocking device 7 according to the first embodiment of the present disclosure. FIG. 4A shows a detailed view from FIG. 3A, and FIG. 4B shows a detailed view from FIG. 3B.

A tool 9 is inserted in a steep taper 8 with a gripper groove 8a (also called a gripper flute), a steep taper shaft 8b, and a tightening bolt 8c. As can better be seen in FIGS. 4A and 4B, the tightening bolt 8c comprises a tightening bolt shaft 8d and a tightening bolt head 8f on the end, the diameter of which is greater than that of the tightening bolt shaft 8d. The tightening bolt 8 has the clamping face 8e between the tightening bolt shaft 8d and the tightening bolt head 8f.

The steep taper shaft 8b is received in a receiving opening 13a of a tool holder body 13 of the tool holder 6 and is located in a peripheral positive engagement of the steep taper shaft 8b with the peripheral wall of the receiving opening 13a of the tool holder body 13 and, because of the tapering shape of the steep taper shaft 8b and the wall of the receiving opening 13a of the tool holder body 13, furthermore in a one-sided positive engagement in the axial direction. The positive connection between the steep taper shaft 8b and the peripheral wall of the receiving opening 13a of the tool holder body 13 in the received position according to FIGS. 3B and 4B therefore only allows a removal of the steep taper 8 outwardly in the axial direction (i.e., to the left in FIGS. 3B and 4B). The axial direction is characterised by the dashed horizontal line in FIGS. 3B and 4B.

The tool holder body 13 has a fastening portion 13b, on which a fastening pin 14 (fastening element) is arranged, on which the tool holder body 13 can be fastened on a chain member of the chain of the tool magazine 2. In particular, the fastening pin 14 allows a pivotable fastening of the tool holder body 13 on a chain body of the chain of the tool magazine 2 which allows a pivoting of the tool holder body 13 or the axial direction of the tool holder 6 downward through 90 degrees, in order to pivot the tool holder 6 at the tool-changing position into the tool-changing position according to FIGS. 1A to 2C. In order to be able to control or guide this pivoting movement, a guide portion 13c of the tool holder body 13 has a guide element 15.

If the guide element 15 at the tool-changing position is guided downward, the tool holder 6 pivots guided downward into the tool-changing position according to FIGS. 1A to 2C. FIG. 1B accordingly shows for this a vertically displaceable gripping element 2c of the tool magazine, which is, by way of example, set up to move the guide element 15 of the tool holder 6a located at the tool-changing position downward at the tool-changing position, in order to pivot the tool holder 6a downward through 90 degrees.

For this purpose, the gripping element 2c allows a horizontal play when guiding the guide element 15 vertically downward in order to allow a lateral movement of the guide element 15. The tool holder 6a can therefore be pivoted with a simple vertical linear movement of the gripping element 2c, although the guide element 15 itself carries out a rotary movement about the suspension point of the fastening pin 14 and, in the process, does not carry out a simple linear movement, but follows a circular arc path.

Figure 3B:
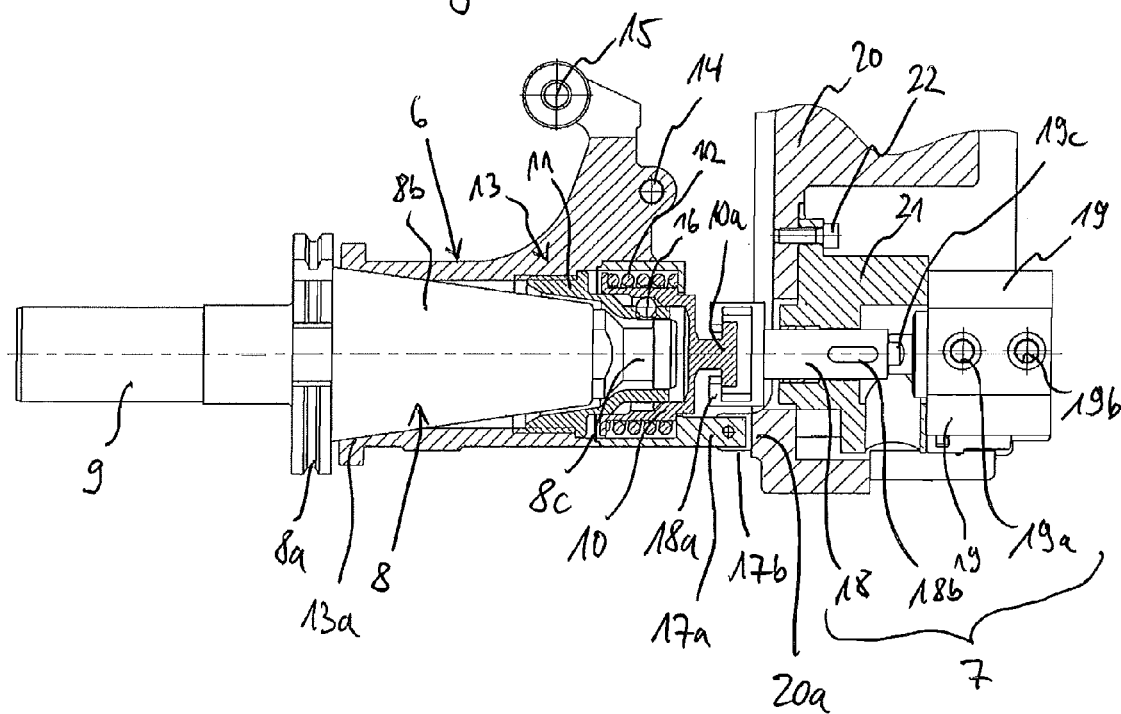
FIG. 3B shows a sectional view along the axial direction of a tool holder with an unlocked tool taper and an unlocking device according to the first embodiment of the present disclosure.

The tool holder 6 furthermore comprises a locking mechanism to lock the tool received in the tool holder 6. The locking mechanism comprises a holding element 11, a tightening element 10, a ball element 16, and a spring element 12. FIGS. 3A and 4A show the locking mechanism in the locked state and FIGS. 3B and 4B show the locking mechanism in the unlocked state.

The holding element 11 surrounds the tightening bolt 8c of the steep taper 8 peripherally and is arranged in the tool holder body 13 so as to be fixed both in the axial and in the radial direction. The holding element 11 comprises a holding hole 11a running in the radial direction, in which the ball element 16 is radially movably held. The diameter of the ball element 16 is greater than the depth of the holding hole 11a. In addition, the diameter of the holding hole 11a receiving the ball element 16 can taper inwardly in order to prevent a slipping of the ball element 16 inwardly when no steep taper 8 is received in the tool holder 6.

An end portion 11b of the holding element 11 is adapted, by way of example, to the shape of the tightening bolt 8c of the steep taper 8 in such a way that the end portion 11b of the holding element 11 with the tightening bolt head 8f is located in a peripheral positive engagement, so the tightening bolt head 8f surrounded by the end portion 11b is fixed in the radial direction.

The tightening element 10 surrounds the holding element 11 peripherally and is arranged in the tool holder body 13 so as to be fixed in the radial direction. However, the tightening element 10 is arranged in the tool holder body 13 so as to be movable relative to the holding element 11 in the axial direction.

In particular, the tightening element 10 can be moved in the axial direction between a first position according to FIGS. 3A and 4A and a second position according to FIGS. 3B and 4B. The spring element 12 pre-stresses the tightening element 10 from the second position toward the first position, i.e., the spring element 12 produces a restoring force acting on the tightening element 10 toward the first position when the tightening element 10 is in the second position. In other words, the restoring force of the spring element in FIGS. 3B and 4B acts to the left, the tightening element 10 adopting the first position in FIGS. 3A and 4A and adopting the second position in FIGS. 3B and 4B. Without an external action on the tightening element 10 (for example, by means of an unlocking device), the spring element 12 pre-stresses the tightening element 10 into the first position, i.e., into a locked state of the locking mechanism.

The tightening element 10 is configured in such a way that the internal diameter of the tightening element 10 in the region of the portion of the tightening element 10 adjacent to or adjoining the holding hole 11a in the first and second position tapers in a direction from the second position to the first position (i.e., from left to right in FIGS. 3A to 4B) (inwardly reduced). By way of example, the inner wall of the holding element 10 for this purpose, in the region of the portion of the tightening element 10 adjacent to or adjoining the holding hole 11a in the first and second position, has a partial hollow taper portion 10d.

The inner wall of the tightening element 10 with the partial hollow taper portion 10d is configured here, in particular, in such a way that the ball element 16 is moved by the partial hollow taper portion 10d radially inwardly into the holding hole 11a when the tightening element is moved from the second position toward the first position (i.e., when the tightening element in FIG. 3B is moved to the left).

When the steep taper 8 is received in the receiving opening 13a of the tool holder body 13, the partial hollow taper portion 10d of the tightening element 10 presses the ball element 16 through the holding hole 11a against the clamping face 8e of the tightening bolt 8c of the steep taper 8 when the tightening element 10 is in the first position (see FIGS. 3A and 4A). In this first position, the steep taper 8 is locked in the tool holder 6, as the ball element 16 pressed inwardly clamps the tightening bolt 8a of the steep taper 8 and fixes or locks it axially.

If, on the other hand, the tightening element 10 is moved from the first position into the second position (i.e., to the right in FIGS. 3A to 4C), the configuration of the inner wall of the tightening element 10 allows the ball element 16 to give way radially outwardly until the tightening bolt 8c or, in particular, the tightening bolt head 8f is released or is no longer blocked by the ball element 16, as shown in FIGS. 3B and 4B. In this second position, the steep taper 8 in the tool holder 6 is unlocked, as the ball element 16 giving way outwardly no longer clamps the tightening bolt 8a of the steep taper 8 and no longer fixes it axially.

Furthermore, the tightening element 10 at the end comprises a tightening portion 10a that projects from the tool holder on the side opposing the receiving opening 13a of the tool holder body 13. This advantageously allows the tightening portion 10a of the tightening element 10 to be easily accessible from the outside and to be movable by the axial action of force, in particular to steer the tightening element 10 from the first position into the second position or from the second position into the first position to easily be able to unlock the steep taper 8 by means of a separate unlocking device.

An unlocking device 7 is furthermore fastened at the unlocking position of the tool magazine 2. The unlocking device 7 comprises a fastening element 21 that is fastened on a fastening portion 20 of the tool magazine 2 by means of a screw 22 and holds a tightening device 19 and an axially movable tightening element 18. By way of example, the tightening device 19 is configured as a pneumatic cylinder with pneumatic connections 19a and 19b.

The tightening element 18 of the unlocking device 7 has a tightening portion 18a at the end that faces the tool holder 6 and can be brought into an engagement state according to FIGS. 3A and 3B with the tightening portion 10a of the tightening element 10 of the locking mechanism of the tool holder 6 by a relative movement between the first tightening element 10 and the second tightening element 18 in a direction lying perpendicular to the axial direction (perpendicular to the illustration plane of FIGS. 3A and 3B). In the engagement state of the first tightening element 10 and of the second tightening element 18, the tightening elements 10 and 18 or the tool holder 6 are coaxially oriented with the unlocking device 7, as shown in FIGS. 3A and 3B.

In particular, the first tightening portion 10a and the second tightening portion 18a are configured in such a way that the first tightening portion 10a and the second tightening portion 18a perpendicular to the axial direction (in particular, perpendicular to the illustration plane of FIGS. 3A and 3B or parallel to the pivot axis of the fastening element 14) do not block one another or are mutually configured to be freely movable with respect to one another in this direction.

Furthermore, the second tightening portion 18a and the first tightening portion 10a in the engagement state according to FIGS. 3A and 3B are in positive non-detachable engagement in the axial direction. "Non-detachable positive engagement in the axial direction" means here, in the sense of the present disclosure, that the second tightening portion 18a and the first tightening portion 10a block one another on both sides in the axial direction by a respective mutual positive engagement, although no simultaneous positive engagement on both sides is present, by way of example, so the second tightening portion 18a and the first tightening portion 10a are axially movable relative to one another within the limits of an axial play range and an axial relative movement going beyond the axial play range is positively non-detachably blocked in the two axial directions.

In the embodiment according to FIGS. 3A and 3B, this is brought about, by way of example, in that the tightening portion 10a of the tightening element 10 of the tool holder 6 has a tightening shaft portion 10b projecting axially from the tool holder 6 and a tightening head portion 10c arranged on the side of the tightening shaft portion 10b remote from the tool holder 6. By way of example, this is realised in FIGS. 3A and 3B by a T-shaped profile of the tightening portion 10a.

The tightening portion 18a of the tightening element 18 of the unlocking device 7 is configured with a gripper profile (for example, claw profile) that encompasses the tightening head portion 10c of the tightening portion 10a of the tightening element 10 of the tool holder 6 in the engagement state and therefore blocks on both sides in the axial direction. Further details of a configuration, by way of example, of the tightening portion 18a of the tightening element 18 of the unlocking device 7 will be described below with reference to FIG. 8.

The unlocking device 7 is suitable to steer the tightening element 18 in the axial direction. It is therefore possible in the engagement state to move the tightening element 10 of the tool holder 6 in the axial direction from the second position according to FIGS. 3A and 4A into the first position according to FIGS. 3B and 4B and to unlock the steep taper 8 received in the tool holder 6 (for example, in further embodiments, optionally also to move the tightening element 10 of the tool holder 6 in the axial direction from the first position according to FIGS. 3A and 4A into the second position according to FIGS. 3B and 4B and to lock the steep taper 8 received in the tool holder 6). The unlocking is brought about here, by way of example, by tightening the tightening element 10 in the axial direction toward the unlocking device 7 or away from the tool holder 6. A locking can, on the other hand, be brought about, by way of example, by moving the tightening element 18 in the axial direction away from the unlocking device 7 or toward the tool holder 6 in order to allow the tightening element 10 pre-stressed by the spring element 12 to return to the locked first position.

As already mentioned above, the tightening device 19 is, by way of example, configured as a pneumatic cylinder. By way of example, a pneumatic connection 19a is provided here to carry out an unlocking movement of the tightening element 18 away from the tool holder, and a pneumatic connection 19b is provided to carry out a locking movement of the tightening element 18 toward the tool holder. However, the present disclosure is not limited to embodiments in which the tightening device 19 is configured as a pneumatic cylinder or as another pneumatically operated device, but, apart from a pneumatic controller, it is furthermore also possible to provide hydraulically, electrically, and/or mechanically operated activation mechanisms.

As becomes clear with the aid of FIGS. 3A and 3B, this embodiment of the present disclosure is configured by way of example in such a way that the first tightening element 10 is pulled by means of the second tightening element 18 in the engagement state with the first tightening element 10 to unlock the tool taper 8 received and locked in the tool holder 6 away from the tool holder 6 and toward the unlocking device 7. As, however, the fastening of the tool holder 6 takes place pivotably, by way of example, by means of the fastening element 14, the tool holder body 13 furthermore has a stopper portion 17a that holds a stopper element 17b. As shown by way of example in FIGS. 4A and 4B, the stopper element 17b is rotatably held on the stopper portion 17a for adjustment about a fixable pivot axis 17c.

The stopper portion 17a and the stopper element 17b project in the axial direction on the side of the tool holder 6 on which the tightening portion 10a also projects in the axial direction. In particular, the stopper portion 17a with the stopper element 17b projects further in the axial direction than the tightening portion 10a of the tightening element 10 of the tool holder 6.

In the engagement state, the stopper element 17b rests on a stopper face 20a of the fastening element 20 of the tool magazine 2 (or in alternative embodiments also of the unlocking device itself), so a pivoting movement of the tool holder 6 about the pivot axis of the fastening element 14 is positively blocked when the tightening element 10 is moved by the tightening element 18 from the first position into the second position.

Figure 5:
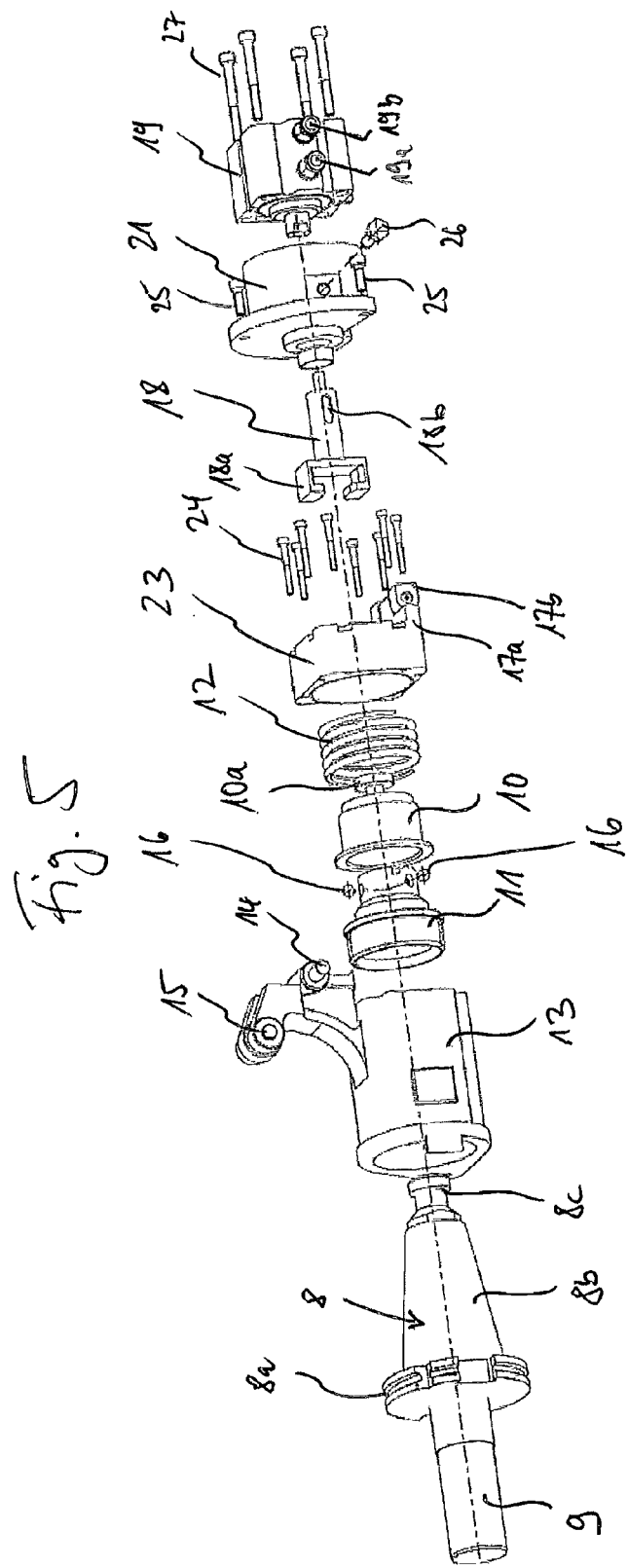
FIG. 5 shows an exploded view of a tool holder and an unlocking device according to the first embodiment of the present disclosure.
Figure 6:
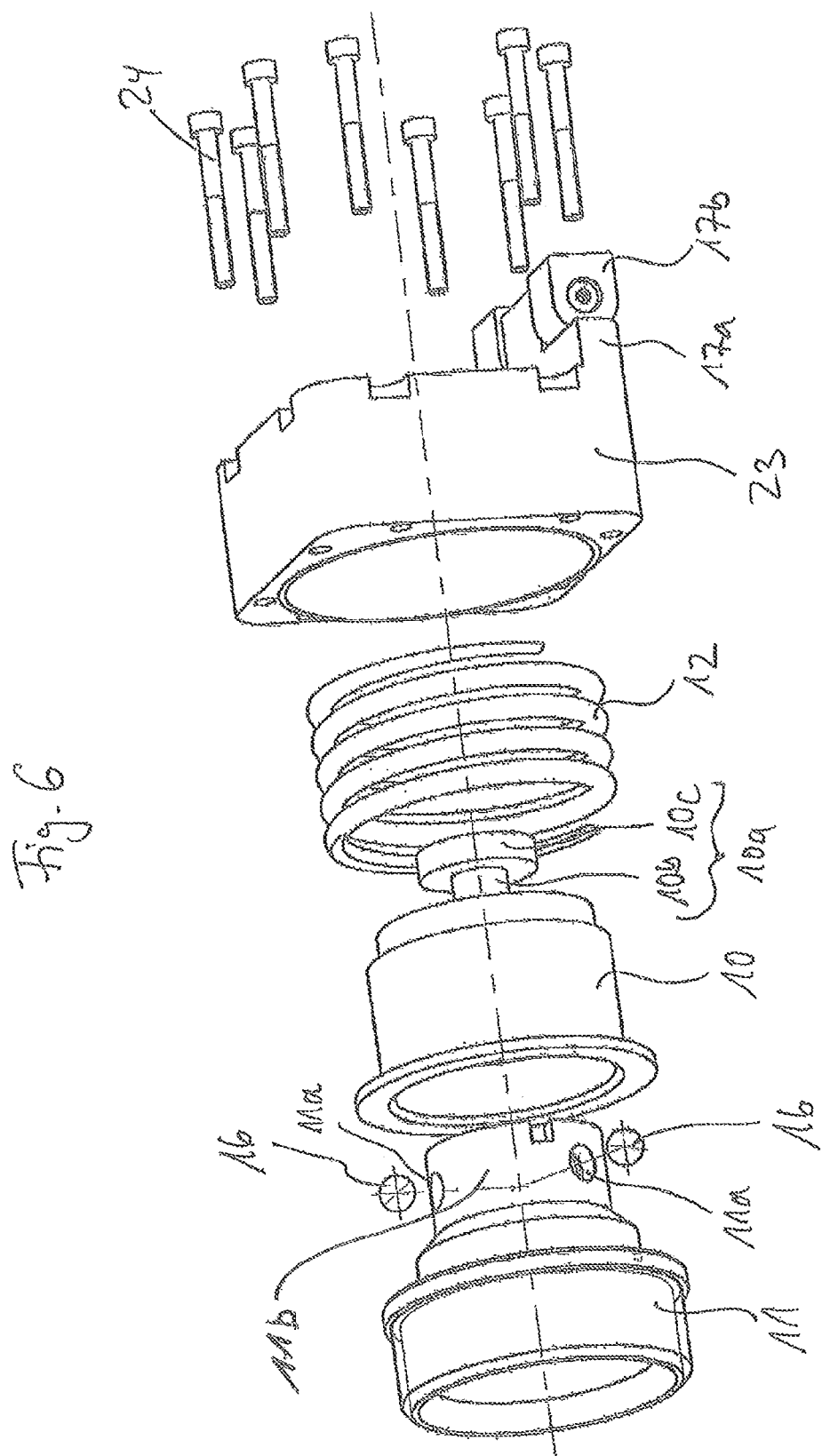
FIG. 6 shows a detailed view of the exploded view of the tool holder from FIG. 5.

FIG. 5 shows an exploded view of the tool holder 6 and the unlocking device 7 from FIGS. 3A and 3B. FIG. 6 shows a detailed view of the exploded view of the tool holder 6 from FIG. 5, and FIG. 7 shows a detailed view of the exploded view of the unlocking device 7 from FIG. 5.

As shown by way of example in FIGS. 5 and 6, the holding element 11 may peripherally also have a plurality of holding holes 11a, which then in each case hold a radially movable ball element 16. In addition, it is also shown by way of example in FIGS. 5 and 6 that the locking mechanism (comprising the holding element 11, the one or the plurality of ball elements 16, the tightening element, and the spring element 12) becomes/is inserted in an opening of the tool holder body 13 and is fixed in the tool holder body 13 with a tool holder body terminating element 23, which becomes/ is fastened by means of screws 24 on the tool holder body 13. By way of example, the tool holder body terminating element 23 comprises the stopper portion 17a holding the stopper element 17b.

Figure 7:
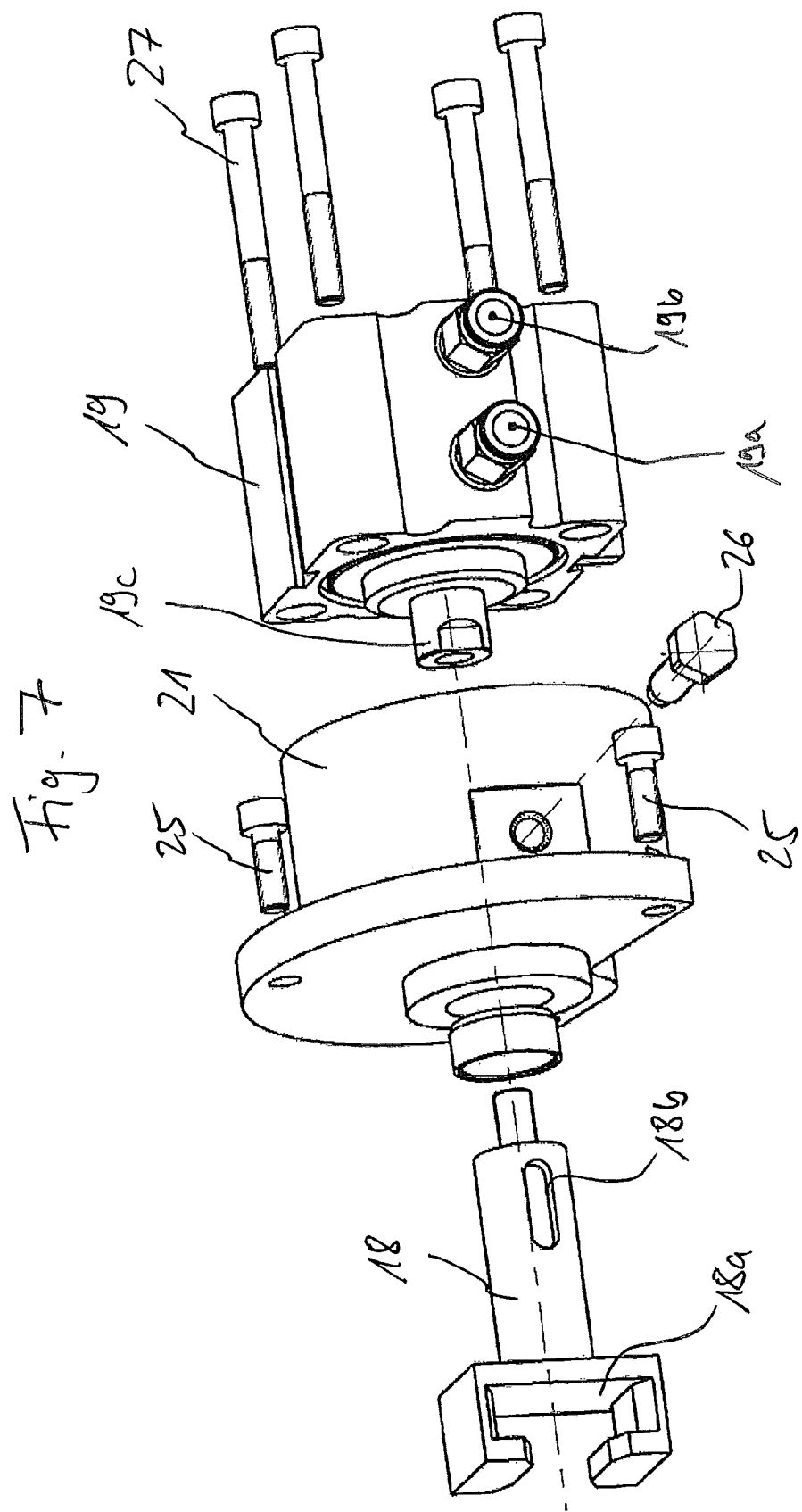
FIG. 7 shows a detailed view of the exploded view of the unlocking device from FIG. 5.

As shown by way of example in FIGS. 5 and 7, the fastening element 21 of the unlocking element 7 can be fastened by means of screws 25 on the tool magazine 2, whereas the tightening device 19 is fastened by way of example by means of screws 27 on the fastening means 21. The tightening element 18 is fastened by means of a fastening element 19c on the tightening device 19. Furthermore, the tightening element 18, by way of example, has an elongate hole 18b running in the axial direction in which a screw 26 to be screwed into the fastening element extends and limits the axial freedom of movement of the tightening element 18 depending on the length of the elongate hole 18b on both sides.

Figure 8:
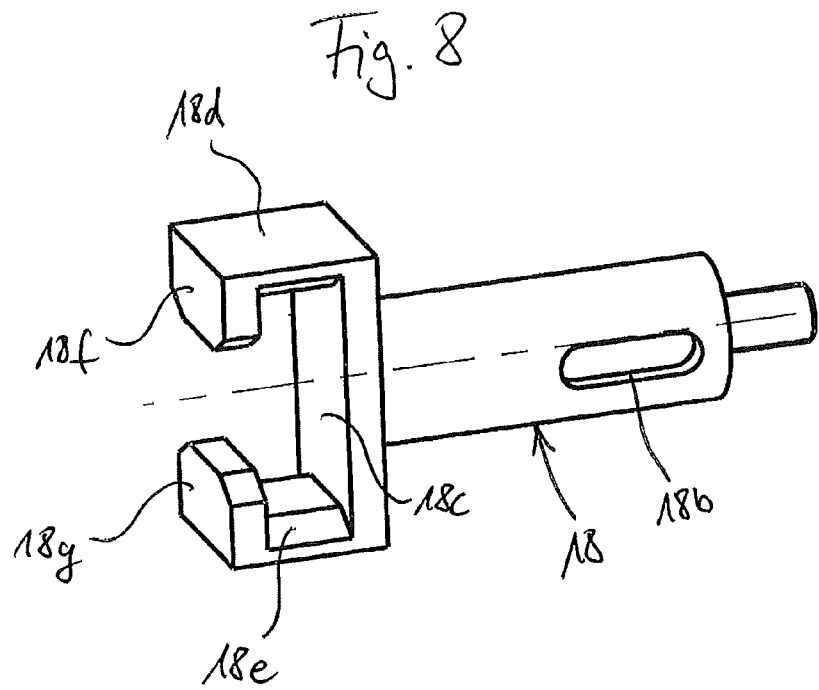
FIG. 8 shows a perspective view of the second tightening element from FIG. 7.

FIG. 8 shows a perspective view of the second tightening element 18 from FIG. 7. The tightening portion 18a of the tightening element 18, on the side remote from the tightening element 10 or on the side facing the tightening device 19, comprises a wall portion 18c, which extends in a plane perpendicular to the axial direction.

This wall portion 18c blocks the axial movement of the tightening portion 10a of the tightening element 10 of the tool holder 6 in the axial direction toward the tightening device 19 or away from the tool holder 6 and therefore allows the tightening portion 10a of the tightening element 10 to be moved toward the tool holder 6 or away from the tightening device 19 by means of a contact between the wall portion 18c and the tightening portion 10a of the tightening element 10 of the tool holder 6, in that the tightening element 18 is pressed by the tightening device 19 toward the tool holder 6.

Furthermore, the tightening portion 18a of the tightening element 18 comprises two wall portions 18d and 18e that extend in the axial direction and are opposing in a second direction lying perpendicular to the axial direction, said wall portions, by way of example, running in planes that are parallel to one another and to the axial direction.

If the tightening portion head 10c of the tightening portion 10a of the tightening element 10 is in the engagement state between the wall portions 18d and 18e of the tightening portion 18a of the tightening element 18, a movement of the tightening portion 10a in the second direction (vertically in FIGS. 3A to 4C) is blocked by the wall portions 18d and 18e. The wall portions 18d and 18e pass into the wall portion 18c on the side facing the tightening device 19.

On the other hand, two opposing sides in a first direction lying perpendicular to the axial direction and perpendicular to the second direction are configured without a blocking wall.

In other words, a movement of the tightening portion 10a in the first direction is not blocked by the tightening portion 18a, even when the tightening portion head 10c of the tightening portion 10a is located between the wall portions 18d and 18e. The tightening portion 10a and the tightening portion 18a can therefore be freely moved relative to one another in the first direction (the first direction corresponds here to the direction lying perpendicular to the plane of the drawing of FIGS. 3A to 4B).

Furthermore, the tightening portion 18a of the tightening element 18 on the side facing the tightening element 10 or on the side remote from the tightening device 19 comprises a first blocking portion 18f and a second blocking portion 18g, the first blocking portion 18f passing into the wall portion 18d and the second blocking portion 18g passing into the wall portion 18e.

When the tightening portion head 10c of the tightening portion 10a is in the engagement state between the wall portions 18d and 18e, the first blocking portion 18f and the second blocking portion 18g block the axial movement of the tightening portion 10a of the tightening element 10 of the tool holder 6 in the axial direction away from the tightening device 19 or toward the tool holder 6 and therefore allow, by means of a contact between the blocking portions 18g and 18f and the tightening portion 10a of the tightening element 10 of the tool holder 6, the tightening portion 10a of the tightening element 10 to be moved away from the tool holder 6 or toward the tightening device 19, in that the tightening element 18 of the tightening device 19 is pulled away from the tool holder 6.

The blocking portions 18g and 18f have a spacing from one another that is greater than the diameter of the tightening portion shaft 10b and smaller than the tightening portion head 10c, so the tightening portion shaft 10b can project through between the blocking portions 18g and 18f in the axial direction, but the blocking portions 18g and 18f block the axial movement of the tightening portion head 10c.

Figure 9:
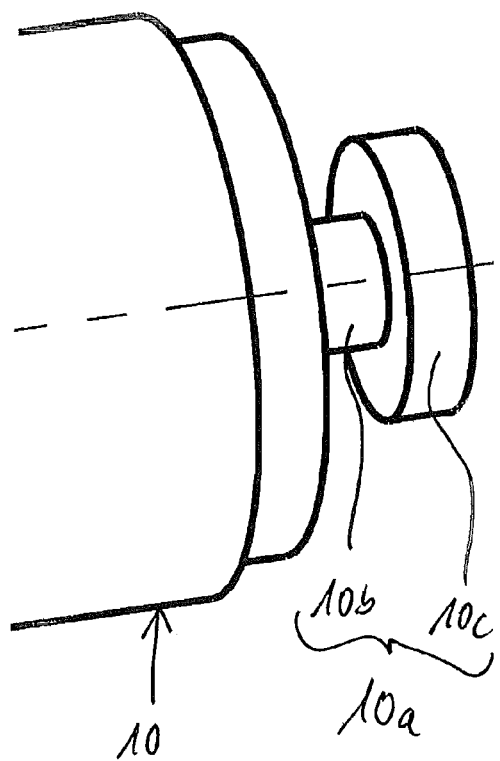
FIG. 9 shows a perspective view of the first tightening element from FIG. 6.

FIG. 9 shows a perspective view of the first tightening element 10 from FIG. 6. The tightening portion 10a of the tightening element 10 at the end on the side remote from the tool holder 6 has the tightening portion shaft 10b and the tightening portion head 10c adjoining it at the end.

As already described above, the diameter of the tightening portion shaft 10b is smaller than the spacing of the blocking portions 18g and 18f, so the tightening portion shaft 10b can project through between the blocking portions 18g and 18f in the axial direction, and the diameter of the tightening portion head 10c is greater than the spacing of the blocking portions 18g and 18f, so the blocking portions 18g and 18f block the axial movement of the tightening portion head 10c. In addition, the axial width of the tightening portion head 10c is smaller than the spacing of the blocking portions 18g and 18f from the wall portion 18c in the axial direction. The axial length of the tightening portion shaft 10b is greater than the axial width of the blocking portions 18g and 18f. Therefore, it can easily be ensured that an engagement state of the first tightening portion 10a with the second tightening portion 18a according to FIGS. 3A to 4B is made possible.

In alternative embodiments, it is possible to provide only one of the blocking portions 18g and 18f on the tightening element 18. Furthermore, it would be possible, instead of the tightening portion 10a with a T-shaped profile, to provide a tightening portion 10a with an L-shaped profile. In further embodiments, it is possible to configure the tightening element of the tool holder 6 according to the tightening element according to FIG. 8 and to configure the tightening element of the unlocking device 7 according to the tightening element according to FIG. 9.

Figure 10A:
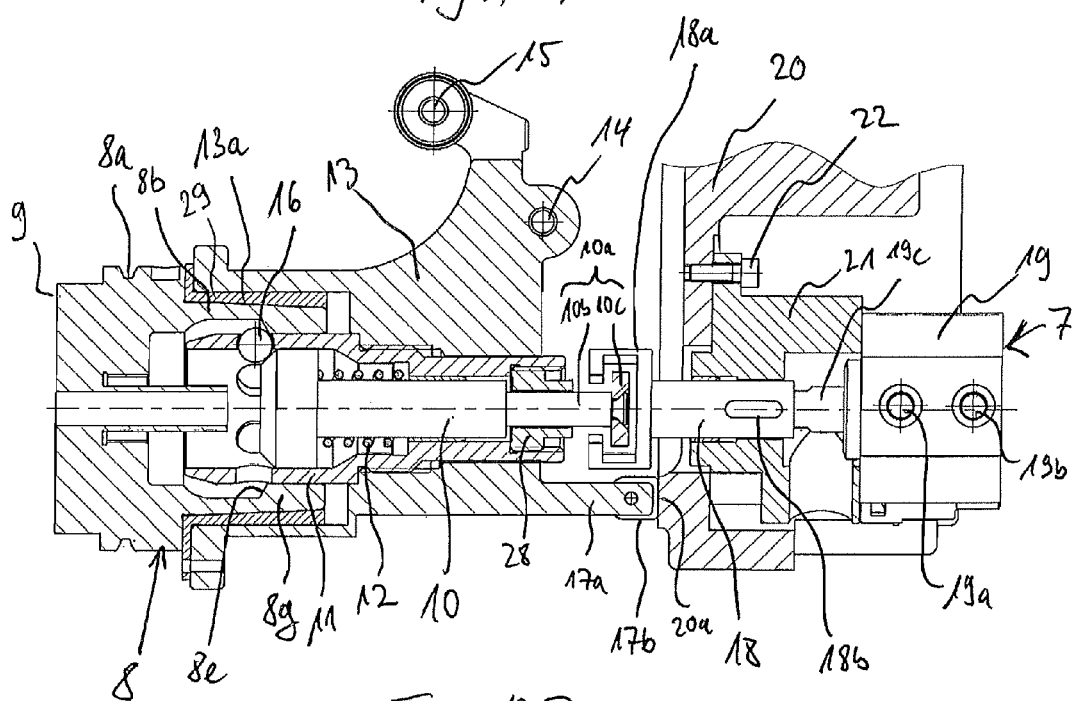
FIG. 10A shows a sectional view along the axial direction of a tool holder with a locked tool taper and an unlocking device according to a second embodiment of the present disclosure.
Figure 10B:
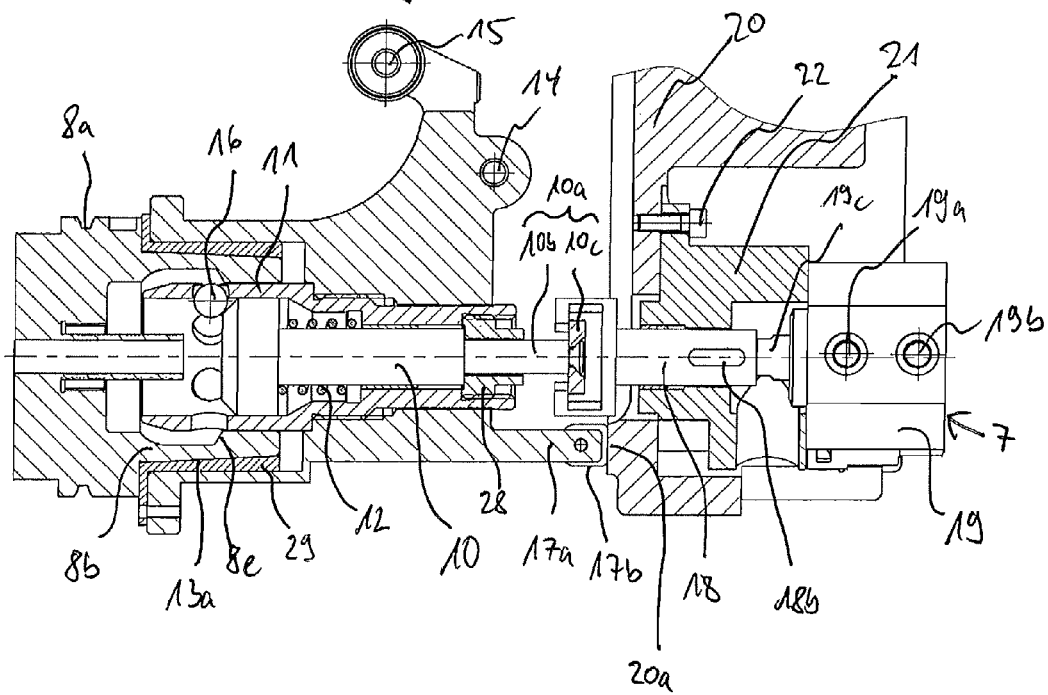
FIG. 10B shows a sectional view along the axial direction of a tool holder with an unlocked tool taper and an unlocking device according to the second embodiment of the present disclosure.
Figure 11B:
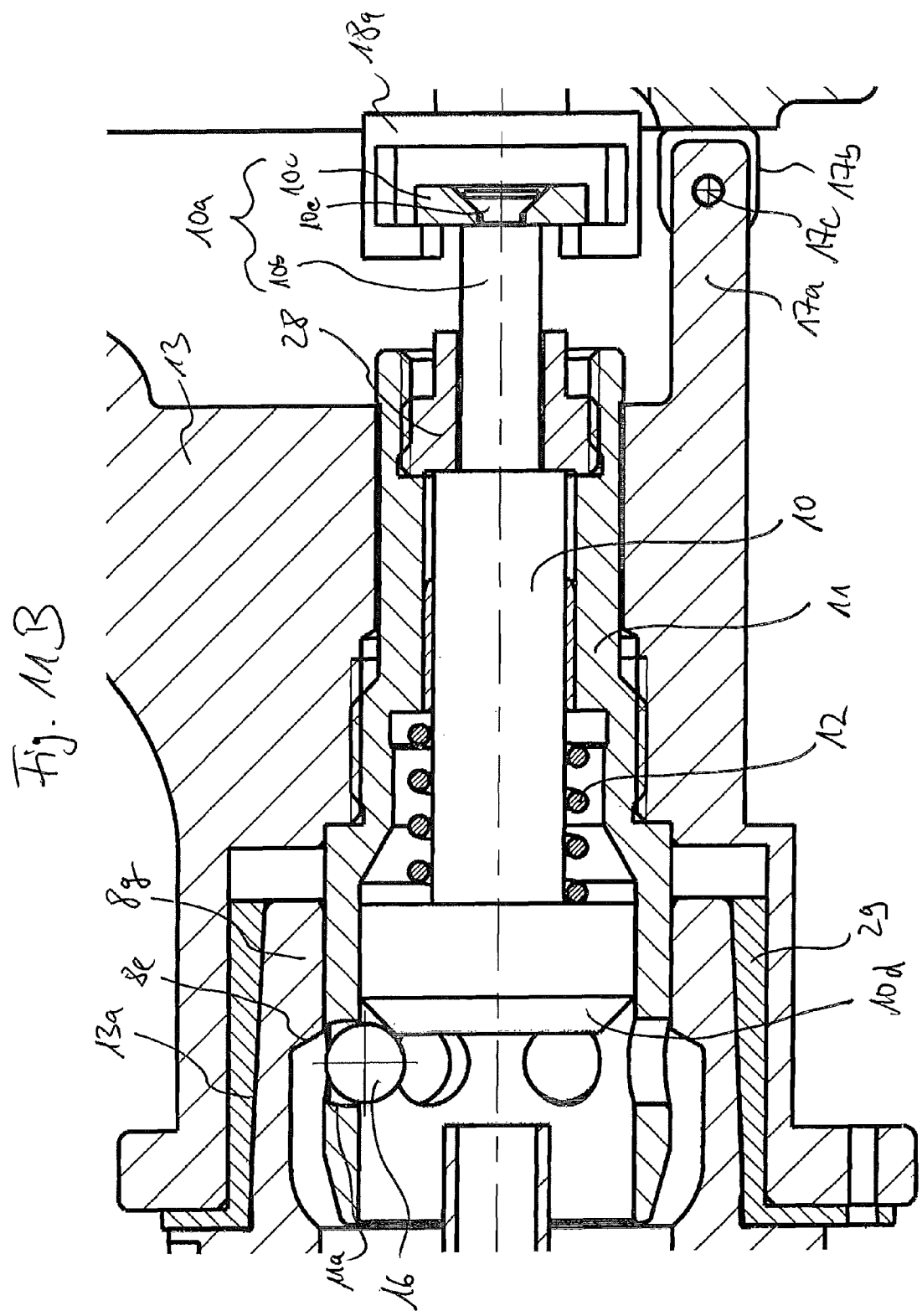
FIG. 11B shows a detailed view from FIG. 10B.

FIG. 10A shows a sectional view along the axial direction of a tool holder 6 with a locked tool taper 8 and an unlocking device 7 according to a second embodiment of the present disclosure and FIG. 10B shows a sectional view along the axial direction of the tool holder 6 with an unlocked tool taper 8 and the unlocking device 7 according to the second embodiment of the present disclosure. FIG. 11A shows a detailed view from FIG. 10A, and FIG. 11B shows a detailed view from FIG. 10B.

In the following description of the second embodiment, in particular the differences between the embodiments are described. The same or similar features are not described again and the description of the first embodiment can be used. In particular, the unlocking device 7 of the second embodiment is configured the same as the unlocking device 7 described above of the first embodiment. In contrast to the tool-receiving opening 13a of the first embodiment, the tool-receiving opening 13a of the tool holder 6 according to the second embodiment is set up to receive a tool taper 8, which is configured as a hollow shaft taper (HST).

A tool 9 is inserted in a hollow shaft taper 8 having a gripper groove 8a (also called a gripper flute) and a hollow shaft taper body 8b. As can better be seen from FIGS. 11A and 11B, the hollow shaft taper body 8b peripherally has a clamping face 8e on the inner wall.

The hollow shaft taper body 8b is received in the receiving opening 13a of the tool holder body 13 of the tool holder 6 and is in a peripheral positive engagement of the hollow shaft taper body 8b with the peripheral wall of the receiving opening 13a of the tool holder body 13 and, because of the tapering outer shape of the hollow shaft taper body 8b and of the wall of the receiving opening 13a of the tool holder body 13, is furthermore in a one-sided positive engagement in the axial direction, which is also provided by the contact of the flat abutment of the hollow shaft taper 8 with the tool holder 6. Therefore, the positive connection between the hollow shaft taper body 8b and the peripheral wall of the receiving opening 13a of the tool holder body 13 in the received position according to FIGS. 10B and 11B only allows a removal of the hollow shaft taper 8 in the axial direction outward (i.e., to the left in FIGS. 10B and 11B). The axial direction is characterized by the dashed horizontal line in FIGS. 10A and 10B.

The tool holder 6 furthermore comprises a locking mechanism to lock the tool received in the tool holder 6. The locking mechanism comprises a holding element 11, a tightening element 10, a ball element 16, and a spring element 12. FIGS. 10A and 11A show the locking mechanism in the locked state and FIGS. 10B and 11B show the locking mechanism in the unlocked state.

The holding element 11 is introduced into the interior of the hollow shaft body 8b, the end portion of which peripherally surrounds the holding element 11. Therefore, the hollow shaft taper 8 is arranged in the tool holder body 13 so as to be fixed in the axial and in the radial direction. The holding element 11 comprises a holding hole 11a running in the radial direction, in which the ball element 16 is radially movably held. The diameter of the ball element 16 is greater than the depth of the holding hole 11a. In addition, the diameter of the holding hole 11a receiving the ball element 16 can taper outwardly in order to prevent the ball element 16 from slipping through outwardly when no hollow shaft taper 8 is received in the tool holder 6.

The tightening element 10 is peripherally surrounded by the holding element 11 and is arranged in the tool holder body 13 or in the holding element 11 so as to be fixed in the radial direction. However, the tightening element 10 is arranged in the tool holder body 13 so as to be movable in the axial direction relative to the holding element 11. In particular, the tightening element 10 can be moved in the axial direction between a first position according to FIGS. 10A and 11A and a second position according to FIGS. 10B and 11B.

The spring element 12 pre-stresses the tightening element 10 from the second position toward the first position, i.e., the spring element 12 produces a restoring force acting on the tightening element 10 toward the first position when the tightening element 10 is in the second position. In other words, the restoring force of the spring element acts to the left in FIGS. 10B and 11B, the tightening element 10 adopting the first position in FIGS. 10A and 11A and adopting the second position in FIGS. 10B and 11B.

The tightening element 10 is configured in such a way that the external diameter of the tightening element 10 in the region of the portion of the tightening element 10 adjacent to or adjoining the holding hole 11a in the first and second position increases in a direction from the first position toward the second position (i.e., from left to right in FIGS. 10A to 11B). By way of example, the outer wall of the holding element 10 for this purpose has a partial taper portion 10d in the region of the portion of the tightening element 10 adjacent to or adjoining the holding hole 11a in the first and second position.

The outer wall of the tightening element 10 with the partial taper portion 10d is, in particular, configured here in such a way that the ball element 16 is moved by the partial taper portion 10d radially outwardly in the holding hole 11a when the tightening element is moved from the second position toward the first position (i.e., when the tightening element in FIG. 10B is moved to the left).

When the hollow shaft taper 8 is received in the receiving opening 13a of the tool holder body 13, the partial taper portion 10d of the tightening element 10 presses the ball element 16 through the holding hole 11a against the clamping face 8e of the hollow shaft body 8b of the hollow shaft taper 8 when the tightening element 10 is in the first position (see FIGS. 10A and 11A). In this first position, the hollow shaft taper 8 is locked in the tool holder 6, as the ball element 16 pressed outwardly clamps the hollow shaft body 8b of the hollow shaft taper 8 and fixes or locks it.

If, on the other hand, the tightening element 10 is moved from the first position into the second position, the configuration of the outer wall of the tightening element 10 allows the ball element 16 to move aside radially inwardly until the hollow shaft body 8b or the clamping face 8e is released or is no longer blocked by the ball element 16, as shown in FIGS. 10B and 11B. In this second position, the hollow shaft taper 8 in the tool holder 6 is unlocked, as the ball element 16 moving away inwardly no longer clamps the hollow shaft body 8b and no longer axially fixes it.

Furthermore, the tightening element 10 at the end comprises a tightening portion 10a that projects from the tool holder on the side opposing the receiving opening 13a of the tool holder body 13 analogously to the first embodiment. This advantageously allows the tightening portion 10a of the tightening element 10 to be easily accessible from the outside and to be able to be moved in a controlled manner, in particular in order to steer the tightening element 10 from the first position into the second position or from the second position into the first position, in order to be able to unlock or lock the hollow shaft taper 8 easily by means of a separate unlocking device.

In the second embodiment according to FIGS. 10A and 10B, the tightening portion 10a of the tightening element 10 of the tool holder 6 also has a tightening shaft portion 10b projecting axially from the tool holder 6 and a tightening head portion 10c arranged on the side of the tightening shaft portion 10b remote from the tool holder 6. However, the tightening portion 10a is configured in two parts due to assembly, the tightening head portion 10c being fastened by means of a screw 10e on the tightening shaft portion 10b.

Figure 13:
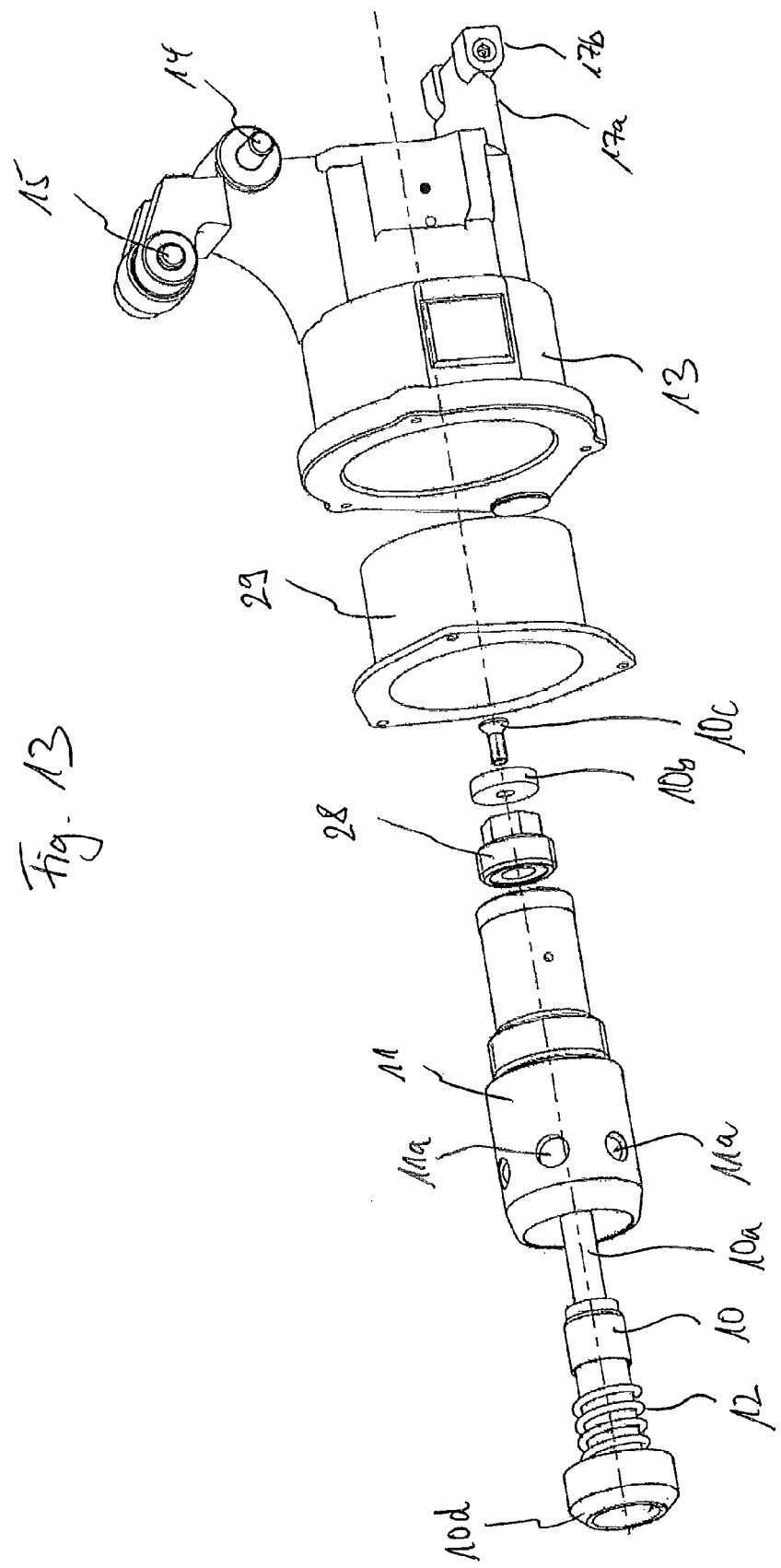
FIG. 13 shows a detailed view of the exploded view of the tool holder from FIG. 12.

FIG. 12 shows an exploded view of the tool body 6 and the unlocking device 7 according to the second embodiment of the present disclosure and FIG. 13 shows a detailed view of the exploded view of the tool holder 6 from FIG. 12.

It can be seen here that the locking mechanism has an additional stopper element 28 that limits the axial movement of the tightening element 10 in a direction from the second position into the first position, the tightening element 10 in the first position being in contact with the stopper element 28 (see also, for example, FIGS. 11A and 11B).

In addition, a receiving element 29 is shown that has the receiving opening 13a and is introduced into an opening of the tool holder body 13 (see also FIGS. 10A to 11B). The receiving element 29 can, for example, be changed, in order to be able to receive different hollow shaft bodies 8b with different diameters in the same tool holder body 13.

LIST OF REFERENCE NUMERALS 1 machine tool
2 tool magazine
2a chain wheel
2b controllable round axle
2c vertically displaceable gripper element
3 spindle carrier
4 spindle
5 tool changer
5a double gripper arm
5b gripper portion of the double gripper arm
5c gripper portion of the double gripper arm
5d controllable round axle
6 tool holder
6a tool holder (at the tool-changing position)
6b tool holder (at the tool unlocking position or input position)
7 unlocking device
8 tool taper (ST or HST)
8a gripper groove
8b steep taper shaft at ST or hollow shaft body at HST
8c tightening bolt at ST
8d tightening bolt shaft at ST
8e clamping face at ST and HST
8f tightening bolt head at ST
8g end portion at HST
9 tool
10 tightening element (first)
10a tightening portion (first)
10b tightening portion shaft
10c tightening portion head 10d partial hollow taper portion at ST or partial taper portion at HST
10e screw
11 holding element
11a holding hole (holding holes)
11b end portion
12 spring element
13 tool holder body
13a receiving opening
13b fastening portion
13c guide portion
14 fastening pin/fastening element
15 guide element
16 ball element(s)
17a stopper portion
17b stopper element
17c fixable pivot axle
18 tightening element (second)
18a tightening portion (second)
18b elongate hole
18c axially blocking wall portion
18d radially blocking wall portion
18e radially blocking wall portion
18f axially blocking portion
18g axially blocking portion
19 tightening device
19a pneumatic connection
19b pneumatic connection
19c fastening element
20 fastening portion
20a stopper face
21 fastening element
22 screw
23 terminating element
24 screws
25 screws
26 screw
27 screws
28 stopper element
29 receiving element The embodiments of the present disclosure in which an exclusive property or privilege is claimed are defined as follows:

1. A system comprising, in combination:
 a tool holder for receiving and locking a tool taper on a tool magazine, comprising:
  a receiver for receiving the tool taper in an axial direction of the tool holder, wherein the tool taper is received on a first side of the tool holder by the receiver;
  a locking means to lock the tool taper received in the receiver; and
  a first fastener for fastening the tool holder on the tool magazine,
  wherein the locking means comprises a first tightening element that is movable in the axial direction of the tool holder and that is set up to be moved in the axial direction of the tool holder from a first position into a second position, the tool taper received in the receiver being locked when the first tightening element is in the first position, and the tool taper received in the receiver being unlocked when the first tightening element is in the second position, and
  wherein the first tightening element has a surface that extends transverse to the axial direction of the tool holder, and has a first tightening portion that projects from the surface of the first tightening element, in the axial direction of the tool holder, and which first tightening portion projects from the surface of the first tightening element on a second side of the tool holder opposing the first side of the tool holder; and
 an unlocking device for unlocking the tool taper that is received and locked in the tool holder, the unlocking device comprising:
  a second fastener for fastening the unlocking device on the tool magazine at an unlocking position of the tool magazine; and
  an unlocking means to unlock the tool taper that is received and locked in the tool holder when the tool holder is at the unlocking position,
  wherein the unlocking means comprises a second tightening element that is movable in an axial direction of the unlocking device, which is coaxial with the axial direction of the tool holder, and has a second tightening portion that can be brought into an engagement state with the first tightening portion of the first tightening element, so that the second tightening portion is, in the axial direction of the tool holder, in positive non-detachable engagement with the first tightening portion of the first tightening element when the tool holder is at the unlocking position, during which positive non-detachable engagement the first tightening portion and the second tightening portion are axially movable relative to one another within limits of an axial play range, and
  wherein the unlocking means is set up to unlock the tool taper received in the receiver when the first tightening portion and the second tightening portion are in the engagement state, in that the second tightening element is in respect to the axial direction of the tool holder axially controlled and by means of the positive non-detachable engagement, moves the first tightening element from the first position into the second position.

2. The system according to claim 1, wherein the first tightening portion is configured in such a way that the first tightening portion can be brought into the engagement state with the second tightening portion by a relative movement with respect to the second tightening portion in a first direction perpendicular to the axial direction of the tool holder.

3. The system according to claim 1, wherein the first tightening portion has a tightening head at the end, which tightening head is configured to adopt the positive non-detachable engagement with the second tightening portion in the axial direction of the tool holder, when the first and the second tightening portion are in the engagement state.

4. The system according to claim 1, wherein the first tightening portion has, extending in the axial direction of the tool holder, a T-shaped profile.

5. The system according to claim 1, wherein a first stopper portion is arranged on the second side of the tool holder.

6. The system according to claim 5, wherein the first stopper portion has a stopper element that projects from the tool holder in the axial direction of the tool holder on the second side of the tool holder.

7. The system according to claim 6, wherein the stopper element projects from the tool holder beyond the first tightening portion.

8. The system according to claim 1, wherein the first fastener is set up to fasten the tool holder on the tool magazine so as to be pivotable about an axis arranged perpendicular to the axial direction of the tool holder.

9. The system according to claim 1, wherein the locking means furthermore comprises a holding element that holds a locking element that is movable in a radial direction with respect to the axial direction of the tool holder, wherein the first tightening element forces the locking element in the radial direction into a clamping position, in which the locking element, to lock the tool taper, presses against a clamping face of the tool taper received in the receiver when the first tightening element is in the first position.

10. The system according to claim 9, wherein the locking element is movable in the radial direction between the clamping position and a release position when the first tightening element is in the second position, the locking element not being in contact with the clamping face of the tool taper in the release position.

11. The system according to claim 9, wherein the locking element is configured as a ball element.

12. The system according to claim 9, wherein the tool taper is configured as a steep taper, wherein the receiver is set up to receive the steep taper that has an end tightening piston, wherein the end tightening piston comprises the clamping face of the tool taper, the first tightening element forcing the locking element inwardly in the radial direction into the clamping position, in which the locking element, to lock the steep taper received in the receiver, presses inwardly in the radial direction against the clamping face of the tightening piston of the steep taper when the first tightening element is in the first position.

13. The system according to claim 9, wherein the tool taper is configured as a hollow shaft taper that has an inner clamping face in the interior of a hollow shaft of the hollow shaft taper, wherein the receiver is set up to receive the hollow shaft taper, the first tightening element forcing the locking element outwardly in the radial direction into the clamping position, in which the locking element, to lock the hollow shaft taper received in the receiver, presses outwardly in the radial direction against the inner clamping face of the hollow shaft body when the first tightening element is in the first position.

14. The system according to claim 1, wherein the locking means furthermore comprises a spring element that is set up to exert a restoring force on the first tightening element, wherein the restoring force is acting from the second position toward the first position on the first tightening element.

15. The system according to claim 1, wherein the second tightening portion is configured in such a way that it can be brought by a relative movement with respect to the first tightening portion in a first direction perpendicular to the axial direction of the tool holder into the engagement state with the first tightening portion.

16. A tool magazine for a machine tool comprising:
one or more tool holders each comprising:
  a receiver for receiving a tool taper in an axial direction of the respective tool holder, wherein the tool taper is received on a first side of the respective tool holder by the receiver;
  a locking means to lock the tool taper received in the receiver; and
  a fastener means for fastening the respective tool holder on the tool magazine,
  wherein the locking means comprises a first tightening element that is movable in the axial direction of the respective tool holder and is set up to be moved in the axial direction of the respective tool holder from a first position into a second position, the tool taper received in the receiver being locked when the first tightening element is in the first position, and the tool taper received in the receiver being unlocked when the first tightening element is in the second position, and
  wherein the first tightening element has a surface that extends transverse to the axial direction of the corresponding tool holder, and has a first tightening portion that projects from the surface of the first tightening element, in the axial direction of the corresponding tool holder, and which first tightening portion projects from the surface of the first tightening element on a second side of the respective tool holder opposing the first side of the respective tool holder;
a tool holder fastener; and
a displacing device for displacing at least one of the one or more tool holders, wherein the at least one tool holder is fastened by the respective fastener means to the tool holder fastener, wherein the displacing device is set up to displace the at least one tool holder that is fastened to the tool holder fastener into an unlocking position of the tool magazine, and wherein the at least one tool holder is displaced by the displacing device in a first direction perpendicular to the axial direction of the at least one tool holder,
an unlocking device for unlocking the tool taper that is received and locked in the at least one tool holder, the unlocking device comprising:
  a second fastener for fastening the unlocking device on the tool magazine at the unlocking position; and
  an unlocking means to unlock the tool taper that is received and locked in the at least one tool holder when the at least one tool holder is at the unlocking position,
  wherein the unlocking means comprises a second tightening element that is movable in an axial direction of the unlocking device, which is coaxial with the axial direction of the at least one tool holder, and has a second tightening portion that can be brought into an engagement state with the first tightening portion of the first tightening element, so that the second tightening portion is in the axial direction of the at least one tool holder in positive non-detachable engagement with the first tightening portion of the first tightening element when the at least one tool holder is at the unlocking position,
  wherein the unlocking means is set up to unlock the tool taper received in the receiver when the first tightening portion and the second tightening portion are in the engagement state, in that the second tightening element is in respect to the axial direction of the corresponding tool holder axially controlled and by means of the positive non-detachable engagement, moves the first tightening element from the first position into the second position, and
wherein the first tightening portion is configured in such a way that the first tightening portion can be brought into the engagement state with the second tightening portion by a relative movement with respect to the second tightening portion in the first direction perpendicular to the axial direction of the at least one tool holder, when the displacing device is displacing the at least one tool holder in the first direction, perpendicular to the axial direction of the at least one tool holder, into the unlocking position.

* * * * *